United States Patent
Aziz et al.

(10) Patent No.: US 11,680,329 B2
(45) Date of Patent: Jun. 20, 2023

(54) **MANGANESE OXIDE NANOPARTICLE CARBON MICROPARTICLE ELECTROCATALYST AND METHOD OF MAKING FROM *ALBIZIA PROCERA* LEAF**

(71) Applicant: KING FAHD UNIVERSITY OF PETROLEUM AND MINERALS, Dhahran (SA)

(72) Inventors: Md. Abdul Aziz, Dhahran (SA); Syed Shaheen Shah, Dhahran (SA); Zain Hassan Yamani, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 102 days.

(21) Appl. No.: 16/589,711

(22) Filed: Oct. 1, 2019

(65) Prior Publication Data

US 2021/0095384 A1     Apr. 1, 2021

(51) Int. Cl.
    *C25B 11/077*     (2021.01)
    *C25B 9/17*       (2021.01)
    (Continued)

(52) U.S. Cl.
    CPC .............. *C25B 11/077* (2021.01); *C25B 1/04* (2013.01); *C25B 9/17* (2021.01); *C25B 11/051* (2021.01);
    (Continued)

(58) Field of Classification Search
    CPC ... C25B 11/051; C25B 11/052; C25B 11/054; C25B 11/057; C25B 11/065; C25B 11/077; C25B 11/079; C25B 1/04
    See application file for complete search history.

(56) References Cited

U.S. PATENT DOCUMENTS

2013/0280639 A1* 10/2013 Imai .................... H01M 4/8652
                                                     502/1
2015/0024204 A1    1/2015 Amanchi Bala et al.
                     (Continued)

FOREIGN PATENT DOCUMENTS

CN       105401166 A  *  3/2016  ......... C25B 11/0431
EP       2730681 A1  *  5/2014  ............... C25B 1/04

OTHER PUBLICATIONS

Nalin I. Andersen, Alexey Serov, Plamen Atanassov, Metal oxides/CNT nano-composite catalysts for oxygen reduction/oxygen evolution in alkaline media, Applied Catalysis B: Environmental, vol. 163, 2015, pp. 623-627 (Year: 2015).*

(Continued)

*Primary Examiner* — Alexander W Keeling
*Assistant Examiner* — Mofoluwaso S Jebutu
(74) *Attorney, Agent, or Firm* — Oblon, McClelland, Maier & Neustadt, L.L.P.

(57) ABSTRACT

A method for making an electrocatalyst containing manganese oxide nanoparticles present on carbon obtained from *Albizia procera* ($MnO_xNPs$-C) for electrochemical water oxidation. The method includes a thermal decomposition and forms a product with specific morphological variations, including crystalline structure, elemental composition, and chemical compatibility. The manganese oxide nanoparticles are well dispersed over the carbon. The amount of manganese oxide nanoparticles increases by increasing the amount of precursor. Single-phase formation of the $Mn_3O_4$, and $Mn_3O_4$ along with MnO phase occurs at low and high amount of the precursor materials, respectively. The electrocatalyst can be used for the purpose electrolytic water splitting.

14 Claims, 21 Drawing Sheets

(51) Int. Cl.
- C25B 11/051 (2021.01)
- C25B 11/057 (2021.01)
- C25B 11/065 (2021.01)
- C25B 1/04 (2021.01)
- C25B 11/079 (2021.01)

(52) U.S. Cl.
CPC .......... *C25B 11/057* (2021.01); *C25B 11/065* (2021.01); *C25B 11/079* (2021.01)

(56) References Cited

U.S. PATENT DOCUMENTS

| | | | |
|---|---|---|---|
| 2015/0068917 A1* | 3/2015 | Schlogl | C25B 11/077 204/290.01 |
| 2015/0132669 A1 | 5/2015 | Garsuch et al. | |
| 2016/0141114 A1* | 5/2016 | Shelke | H01G 11/36 252/506 |
| 2017/0283965 A1* | 10/2017 | Nam | C25B 11/091 |
| 2017/0338053 A1* | 11/2017 | Voller | H01G 11/62 |

OTHER PUBLICATIONS

Michael Huynh, Chenyang Shi, Simon J. L. Billinge, and Daniel G. Nocera, Nature of Activated Manganese Oxide for Oxygen Evolution, Journal of the American Chemical Society 2015 137 (47), 14887-14904 (Year: 2015).*

Fuming Wu, Jianping Gao, Xiangang Zhai, Minhui Xie, Yu Sun, Huiying Kang, Qiang Tian, Haixia Qiu, Hierarchical porous carbon microrods derived from albizia flowers for high performance supercapacitors, Carbon, vol. 147, Jun. 2019, pp. 242-251 (Year: 2019).*

Jang, Kihun, et al. "Facile Low-Temperature Chemical Synthesis and Characterization of a Manganese Oxide/Multi-Walled Carbon Nanotube Composite for Supercapacitor Applications." Bulletin of the Korean Chemical Society, vol. 35, No. 10, 2014, pp. 2974-2978 (Year: 2014).*

Xuechun Xiao, Yan Wang, Gang Chen, Lihong Wang, Yude Wang, Mn3O4/activated carbon composites with enhanced electrochemical performances for electrochemical capacitors, Journal of Alloys and Compounds, vol. 703, 2017, pp. 163-173 (Year: 2017).*

Y.Z. Song, R.X. Zhao, K.K. Zhang, J.J. Ding, X.M. Lv, M. Chen, J.M. Xie, Facile synthesis of Mn3O4/double-walled carbon nanotube nanocomposites and its excellent supercapacitive behavior, Electrochimica Acta, vol. 230, 2017, pp. 350-357 (Year: 2017).*

Feng Ma, Anbao Yuan, and Jiaqiang Xu, Nanoparticulate Mn3O4/VGCF Composite Conversion-Anode Material with Extraordinarily High Capacity and Excellent Rate Capability for Lithium Ion Batteries, ACS Applied Materials & Interfaces 2014 6 (20), 18129-18138 (Year: 2014).*

Lingxiang Zhu, Su Zhang, Yuhua Cui, Huaihe Song, Xiaohong Chen, One step synthesis and capacitive performance of graphene nanosheets/Mn3O4 composite, Electrochimica Acta, vol. 89, 2013, pp. 18-23 (Year: 2013).*

Fuming Wu, Jianping Gao, Xiangang Zhai, Minhui Xie, Yu Sun, Huiying Kang, Qiang Tian, Haixia Qiu, Hierarchical porous carbon microrods derived from albizia flowers for high performance supercapacitors, Carbon, vol. 147, 2019, pp. 242-251 (Year: 2019).*

Dr. Justus Masa, et al., "$Mn_xO_y$/NC and $Co_xO_y$/NC Nanoparticles Embedded in a Nitrogen-Doped Carbon Matrix for High-Performance Bifunctional Oxygen Electrodes", Angewandte Chemie International Edition, vol. 53, Issue 32, Jun. 27, 2014, pp. 8508-8512 (Abstract only).

Xin Zhao, et al., "Incorporation of Manganese Dioxide within Ultraporous Activated Graphene for High-Performance Electrochemical Capacitors", ACS NANO, vol. 6, No. 6, May 3, 2012, pp. 5404-5412.

Naotaka Ohno, et al., "Oxygen Reduction Electrode Properties of Manganese Oxide Nanosheet-Based Materials", Topics in Catalysis, vol. 52, Issue 6-7, Jun. 2009, pp. 903-911.

Fabio H.B. Lima, et al., "Electrocatalytic activity of manganese oxides prepared by thermal decomposition for oxygen reduction", Electrochimica Acta, vol. 52, Issue 11, Mar. 2007, pp. 3732-3738 (Abstract only).

Fuming Wu, et al., "Hierarchical porous carbon microrods derived from albizia flowers for high performance supercapacitors", Carbon, vol. 147, Jun. 2019, pp. 242-251 (Abstract only).

Hui-li Fan, et al., "Hollow Carbon Microspheres/$MnO_2$ Nanosheets Composites: Hydrothermal Synthesis and Electrochemical Behaviors", Nano-Micro Letters, vol. 7, Issue 1, 2015, pp. 59-67.

Yi Zhao, et al., "A general strategy for synthesis of metal oxide nanoparticles attached on carbon nanomaterials", Nanoscale Research Letters, vol. 6, No. 71, 2011, pp. 1-5.

Mohammed Ameen Ahmed Qasem, et al., "Influence of Pamoic Acid as a Complexing Agent in the Thermal Preparation of NiO Nanoparticles: Application to Electrochemical Water Oxidation", Materials Science Inc. Nanomaterials & Polymers, Chemistry Select, vol. 3, 2018, pp. 573-580.

Ivelina Zaharieva, et al., "Electrosynthesis, functional, and structural characterization of a water-oxidizing manganese oxide", Energy & Environmental Science, vol. 5, 2012, pp. 7081-7089.

I. Roche, et al., "Carbon-Supported Manganese Oxide Nanoparticles as Electrocatalysts for the Oxygen Reduction Reaction (ORR) in Alkaline Medium: Physical Characterizations and ORR Mechanism", J. Phys. Chem. C, vol. 111, No. 3, 2007, pp. 1434-1443.

\* cited by examiner

MANGANESE OXIDE NANOPARTICLE CARBON MICROPARTICLE ELECTROCATALYST AND METHOD OF MAKING FROM *ALBIZIA PROCERA* LEAF

STATEMENT OF PRIOR DISCLOSURE OF THE INVENTION

Aspects of the present disclosure are disclosed in "Preparation and Characterization of Manganese oxide Nanoparticles-Coated *Albizia procera* Derived Carbon for Electrochemical Water Oxidation," Shah, S. S., Aziz, M. A., Mohamedkhair, A. K. et al., *J Mater Sci: Mater Electron.*, (2019) which published on line on Aug. 9, 2019 which is incorporated herein by reference in its entirety.

STATEMENT OF ACKNOWLEDGEMENT

The support of CENT-KFUPM (Center of Excellence in Nanotechnology-King Fand University of Petroleum and Minerals) research facility utilization is gratefully acknowledged.

BACKGROUND OF THE INVENTION

Field of the Invention

The present invention relates to manganese oxide doped activated carbon derived from *Albizia procera*, an electrocatalyst containing manganese oxide doped on the activated carbon, an electrode coated with the electrocatalyst, and a method for producing hydrogen and oxygen from water using the electrocatalyst.

Description of Related Art

The "background" description provided herein is for the purpose of generally presenting the context of the disclosure. All references cited herein are incorporated by reference. Work of the presently named inventors, to the extent it is described in this background section, as well as aspects of the description which may not otherwise qualify as prior art at the time of filing, are neither expressly or impliedly admitted as prior art against the present disclosure.

Efficient splitting of water into oxygen and hydrogen is a key requirement in promising renewable energy systems. Hydrogen is considered to be a clean fuel of the future because it burns in air to produce only water [Dinga, G. P. "Hydrogen: The ultimate fuel and energy carrier" International journal of hydrogen energy 14(11) (1989) 777-784]. However, using hydrogen as a renewable energy solution can only be successful if the economics of producing hydrogen are favorable. The economics depend heavily on the development of cost-effective green production methods and means of transportation [Crabtree et al. "The hydrogen economy" Physics Today 57(12) (2004) 39-44].

Electro-catalytic water splitting provides a potentially cost-effective, renewable, and clean path for the production of hydrogen gas [Huang et al. "Ultrathin $NiCo_2P_x$ nanosheets strongly coupled with CNTs as efficient and robust electrocatalysts for overall water splitting" Journal of Materials Chemistry A 6(17) (2018) 7420-7427]. The efficiency of the water oxidation reaction ($2H_2O \rightarrow 4H^+ + 4e^- + O_2$) is important. Since a proton is required for the production of molecular hydrogen (FIG. 1), the efficiency and cost of electrochemical water oxidation is partially dependent on the anode materials [Qasem et al. "Influence of Pamoic Acid as a Complexing Agent in the Thermal Preparation of NiO Nanoparticles: Application to Electrochemical Water Oxidation" ChemistrySelect 3(2) (2018) 573-580; Martinez-Huitle et al. "Electrochemical oxidation of organic pollutants for the wastewater treatment: direct and indirect processes" Chemical Society Reviews 35(12) (2006) 1324-1340; and Gerken et al. "Electrochemical Water Oxidation with Cobalt-Based Electrocatalysts from pH 0-14: The Thermodynamic Basis for Catalyst Structure, Stability, and Activity" Journal of the American Chemical Society 133(36) (2011) 14431-14442].

To improve the efficiency of the water splitting reaction the catalytic properties, cost, and stability, of oxygen evolution catalysts (OECs) have received much attention and have been studied by the scientific community for many years. The most studied OECs comprise earth-abundant elements such as nickel oxides ($NiO_x$), nickel-iron oxides ([Ni,Fe]O), cobalt oxides ($CoO_x$), and manganese oxides ($MnO_x$) [See L.-A. Stern, X. Hu, Enhanced oxygen evolution activity by $NiO_x$ and $Ni(OH)_2$ nanoparticles, Faraday discussions 176 (2015) 363-379; J. A. Bau, E. J. Luber, J. M. Buriak, Oxygen evolution catalyzed by nickel-iron oxide nanocrystals with a nonequilibrium phase, AC S Applied Materials & Interfaces 7(35) (2015) 19755-19763; Y. Surendranath, M. W. Kanan, D. G. Nocera, Mechanistic studies of the oxygen evolution reaction by a cobalt-phosphate catalyst at neutral pH, Journal of the American Chemical Society 132(46) (2010) 16501-16509; and M. A. Aziz, A. El-Madkhoum, A. S. Hakeem, M. N. Shaikh, A. U. Rehman, Z. H. Yamani, Effect of Mn precursors on the morphology and electrocatalytic activity toward water oxidation of micro-nanostructured $MnO_x$ films prepared by voltammetric deposition, Journal of Materials Science: Materials in Electronics 28(24) (2017) 18463-18473, each incorporated herein by reference in its entirety]. Among the catalytic oxides of metal ions i.e., Fe, Co, Ni, and Mn, $MnO_x$ is a promising metal-based water oxidation catalyst due to its abundance, low toxicity, low cost, and good activity towards electrochemical water oxidation. [See Aziz et al.; A. Singh, L. Spiccia, Water oxidation catalysts based on abundant 1st row transition metals, Coordination Chemistry Reviews 257(17-18) (2013) 2607-2622; and A. Bergmann, 1. Zaharieva, H. Dau, P. Strasser, Electrochemical water splitting by layered and 3D cross-linked manganese oxides: correlating structural motifs and catalytic activity, Energy Environmental Science 6(9) (2013) 2745-2755, each incorporated herein by reference in their entirety].

$MnO_x$ has been broadly studied in bulk; however, the synthesis of $MnO_x$ materials at nanoscale opens new opportunities. Manganese oxide at nanoscale (i.e., nanorods, nanowires, nanotubes, nanofilms, nanoparticles, and nanofibers) has more efficient catalytic properties for electrochemical water oxidation because of its high surface area. [See N. Koteeswara Reddy, S. Winkler, N. Koch, N. Pinna, Electrochemical water oxidation of ultrathin cobalt oxide-based catalyst supported onto aligned ZnO nanorods, ACS Applied Materials & Interfaces 8(5) (2016) 3226-3232; M. S. El-Deab, M. I. Awad, A. M. Mohammad, T. Ohsaka, Enhanced water electrolysis: electrocatalytic generation of oxygen gas at manganese oxide nanorods modified electrodes, Electrochemistry communications 9(8) (2007) 2082-2087; and H. Chen, X. Huang, L. J. Zhou, G. D. Li, M. Fan, X. Zou, Electrospinning synthesis of bimetallic nickel-iron oxide/carbon composite nanofibers for efficient water oxidation electrocatalysis, ChemCatChem 8(5) (2016) 992-1000, each incorporated herein by reference in their entirety].

Numerous techniques have been developed to synthesize manganese oxides nanomaterials with excellent properties and various shapes, such as micellar methods, sol-gel syntheses, pulsed laser deposition methods, wet chemical routes, electrospinning methods, hydrothermal methods, and electrochemical methods. [See T. Ahmad, K. V. Ramanujachary, S. E. Lofland, A. K. Ganguli, Nanorods of manganese oxalate: a single source precursor to different manganese oxide nanoparticles ($MnO$, $Mn_2O_3$, $Mn_3O_4$), Journal of Materials Chemistry 14(23) (2004) 3406-3410; S. Ching, E. J. Welch, S. M. Hughes, A. B. Bahadoor, S. L. Suib, Nonaqueous Sol-Gel Syntheses of Microporous Manganese Oxides, Chemistry of materials 14(3) (2002) 1292-1299; X. Yu, Y. He, J. Sun, K. Tang, H. Li, L. Chen, X. Huang, Nanocrystalline MnO thin film anode for lithium ion batteries with low overpotential, Electrochemistry Communications 11(4) (2009) 791-794; Y. Oaki, H. Imai, One-Pot Synthesis of Manganese Oxide Nanosheets in Aqueous Solution: Chelation-Mediated Parallel Control of Reaction and Morphology, Angewandte Chemie 119(26) (2007) 5039-5043; Q. Fan, M. S. Whittingham, Electrospun manganese oxide nanofibers as anodes for lithium-ion batteries, Electrochemical solid-state letters 10(3) (2007) A48-A51; W. Xiao, D. Wang, X. W. Lou, Shape-controlled synthesis of $MnO_2$ nanostructures with enhanced electrocatalytic activity for oxygen reduction, The Journal of Physical Chemistry C 114(3) (2009) 1694-1700; D. Yan, P. Yan, G. Yue, J. Liu, J. Chang, Q. Yang, D. Qu, Z. Geng, J. Chen, G. Zhang, Self-assembled flower-like hierarchical spheres and nanobelts of manganese oxide by hydrothermal method and morphology control of them, Chemical physics letters 440 (1-3) (2007) 134-138; W. Wei, X. Cui, W. Chen, D. G. Ivey, Manganese oxide-based materials as electrochemical supercapacitor electrodes, Chemical society reviews 40(3) (2011) 1697-1721; and K. R. Prasad, N. Miura, Electrochemically synthesized $MnO_2$-based mixed oxides for high performance redox supercapacitors, Electrochemistry Communications 6(10) (2004) 1004-1008, each incorporated herein by reference in its entirety]. Recently, many efforts have been made to reduce the particle size of manganese oxide down to the nanometer scale which could accommodate the volume changes, and furthermore offer more active sites for catalytic activity during water oxidation.

To make useable electrode materials, $MnO_x$ is preferably immobilized on solid substrate electrodes like glassy carbon, indium tin oxide, gold or platinum. To immobilize pre-synthesized nanoparticles, the drop-dying method is a simple and straightforward method. However, aggregation of the nanoparticles, reduces the electrochemical active sites. To minimize this aggregation effect, preparation of nanoparticles on comparatively bigger scaffolder like carbon nanotube, graphene and carbon microsphere is an alternative option.

Yi Zhao et. al. reported a general approach for the preparation of metal oxide nanoparticles on various carbon nanomaterials (CNMs). [See Y. Zhao, J. Li, C. Wu, L. Guan, A general strategy for synthesis of metal oxide nanoparticles attached on carbon nanomaterials, Nanoscale research letters 6(1) (2011) 71-71, incorporated herein by reference in its entirety]. The approach was based on the π-π interaction between CNMs and modified aromatic organic ligands, which acted as bridges for connecting metal ions and CNMs. Captured manganese ions are decomposed to form manganese oxide on the carbon. Carbon having functional groups like amine/carboxylic provides additional support for capturing manganese ions which can be thermally decomposed to form manganese oxide nanoparticle-coated carbon.

Carbon materials have been most promising candidates as electrocatalytic supports due to their chemical compatibility with manganese oxide and good conductivity. Many carbonaceous materials, such as graphene oxide, carbon nanotubes (CNTs), and carbon nanofibers, have been utilized to fabricate nanocomposites of transition metal oxide (i.e., manganese oxide) and carbon as catalytic materials for water oxidation. [See Y. Zhao, R. Nakamura, K. Kamiya, S. Nakanishi, K. J. N. c. Hashimoto, Nitrogen-doped carbon nanomaterials as non-metal electrocatalysts for water oxidation, 4 (2013) 2390; K. Mette, A. Bergmann, J. P. Tessonnier, M. Hävecker, L. Yao, T. Ressler, R. Schlogl, P. Strasser, M. Behrens, Nanostructured manganese oxide supported on carbon nanotubes for electrocatalytic water splitting, ChemCatChem 4(6) (2012) 851-862; Y. Zhao, J. Zhang, K. Li, Z. Ao, C. Wang, H. Liu, K. Sun, G. Wang, Electrospun cobalt embedded porous nitrogen doped carbon nanofibers as an efficient catalyst for water splitting, Journal of Materials Chemistry A 4(33) (2016) 12818-12824, each incorporated herein by reference in their entirety]. However, these manganese oxide/carbon nanocomposites are still far away from being ideal catalytic candidates for water oxidation because they require expensive carbon materials and complicated methods of preparation.

A number of techniques have been developed for the immobilization of nanomaterials on a carbon support such as immobilization of pre-synthesized nanomaterials via linker molecules, electrochemical deposition etc. See I. V. Pavlidis, T. Vorhaben, T. Tsoufis, P. Rudolf, U. T. Bornscheuer, D. Gournis, H. Stamatis, Development of effective nanobiocatalytic systems through the immobilization of hydrolases on functionalized carbon-based nanomaterials, Bioresource technology 115 (2012) 164-171; and I. Roche, E. Chainet, M. Chatenet, J. Vondrak, Carbon-supported manganese oxide nanoparticles as electrocatalysts for the oxygen reduction reaction (ORR) in alkaline medium: physical characterizations and ORR mechanism, The Journal of Physical Chemistry C 111(3) (2007) 1434-1443, each incorporated herein by reference in their entirety. Yet, most of these methods require long preparation time, numerous chemicals, and expensive instruments to complete the immobilization of nanomaterials. These increase the overall cost and process complexity.

None of the above-mentioned catalysts or methods provides an electrocatalyst that is capable of reliably carrying out the HER reaction (hydrogen evolution reaction). It is one objective of the present disclosure to provide carbon microparticles doped with manganese oxide as an electrocatalyst for the electrolytic production of hydrogen from water.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY OF THE INVENTION

In one aspect the present disclosure includes an electrocatalyst that contains manganese oxide nanoparticles supported on carbon microparticles.

In an embodiment, the manganese oxide nanoparticles may be in the form of crystallites having an average diameter in the range of 5-25 nm In an embodiment, the carbon microparticles are derived from *Albizia procera* leaves and have an average longest dimension in the range of 100-300 μm.

In an embodiment, the thickness of the carbon microparticles may be less than 10 μm.

In an embodiment, the manganese oxide nanoparticles have peaks in the XRD at 2(θ) Bragg angles of 37±1° and 42±1°.

In an embodiment, the Mn:C molar ratio is from 5:1 to 1:1.

Another aspect of the present disclosure is related to an electrode that includes an electrically conductive substrate coated with the electrocatalyst of claim 1.

In an embodiment, the electrode has a current density in the range of 6-18 mA/cm$^2$ at 1.5 V and an over potential in the range of 800-90 mV vs. Ag/AgCl at 5 mA/cm$^2$ in 0.1 NaOH.

In an embodiment, the electrocatalyst is present on the surface of the electrode in an amount in the range of 0.2-10 mg/cm$^2$.

In an embodiment, the BET surface area of the electrode is in the range of 100 to 200 m$^2$ g$^{-1}$.

In an embodiment, the electrically conductive substrate is selected from the group consisting of glassy carbon, graphite, gold, platinum, silver, iron, copper, and aluminum.

In another aspect, the present disclosure relates to an electrochemical cell that includes a cathode electrode, an anode electrode and an electrolyte, such that at least one of electrodes is the electrode that includes the electrocatalyst of the present disclosure.

In an embodiment, the electrolyte is an aqueous alkali metal hydroxide.

In an embodiment, the electrolyte is 0.1 M aqueous sodium hydroxide.

Another aspect of the present disclosure relates to a method of producing hydrogen and oxygen from water.

In an embodiment, the method includes applying an electric potential to water in the electrochemical cell of the present disclosure to form hydrogen and oxygen.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
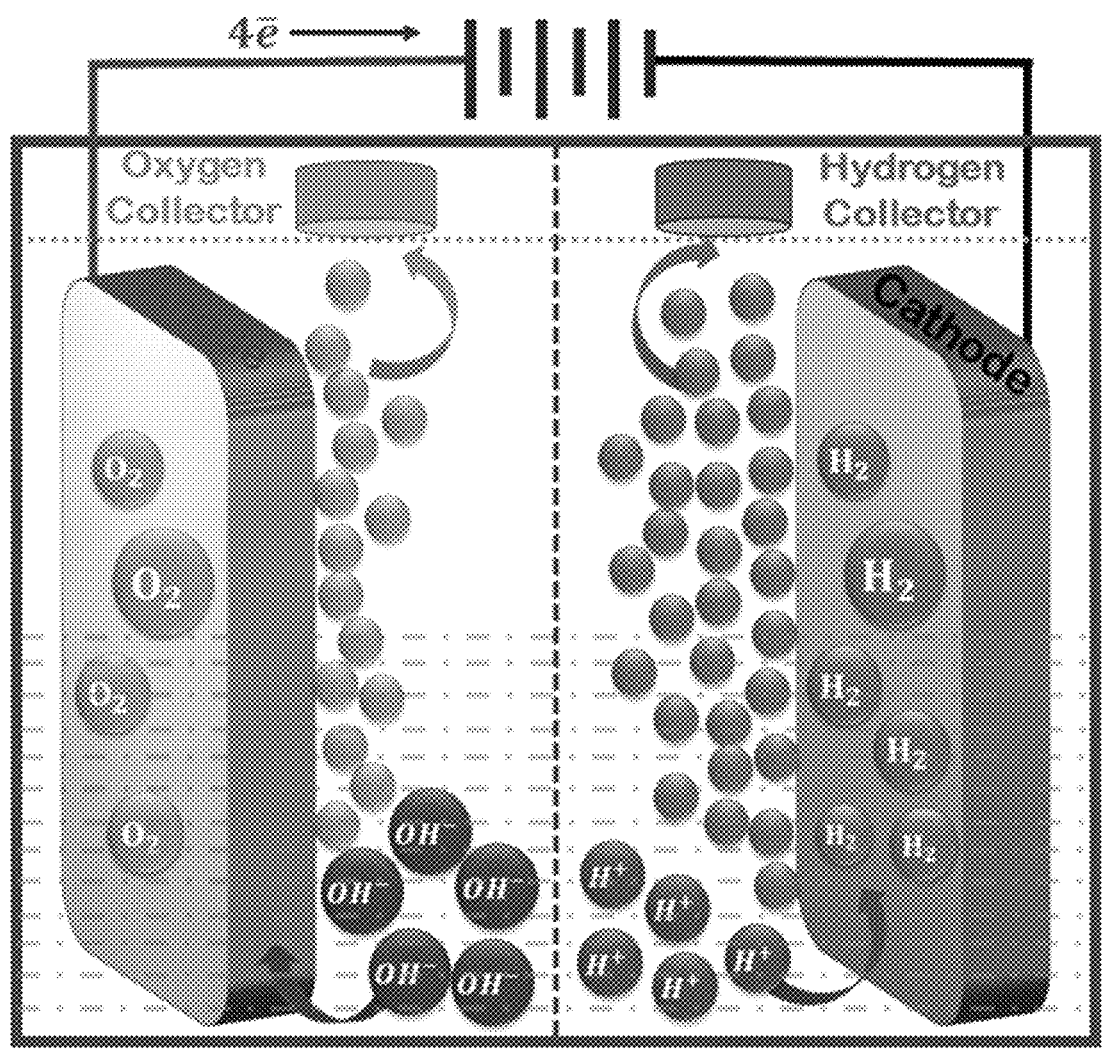
FIG. 1 shows a schematic representation of electrochemical water oxidation, oxidation at anode and reduction along with H$_2$ evolution at cathode.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

Unless otherwise specified, "a" or "an" means "one or more". As used herein, the term "and/or" includes any and all combinations of one or more of the associated listed items and may be abbreviated as "/".

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein in the specification and claims, including as used in the examples and unless otherwise expressly specified, all numbers may be read as if prefaced by the word "substantially", "about" or "approximately," even if the term does not expressly appear. As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8±1.6, ±1.0, ±0.8, ±0.5, ±0.4, ±0.3, ±0.2, or ±0.1.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

As used herein the terms "electrocatalyst" and "catalyst" are used interchangeably and refer to the catalyst of the invention, e.g., manganese and/or manganese oxide doped carbon microparticles, preferably with inclusions or surface features in the form of carbon nanotubes (CNT) and/or carbon nanosheets (CNS).

A method for preparing an effective electrocatalyst, the electrocatalyst, e.g., MnOx nanoparticle-coated *Albizia procera* derived carbon microparticles (MnOxNPs-C), and a method of using the electrocatalyst to split water and form hydrogen. The prepared electrocatalysts were characterized in detail with X-ray diffraction (XRD), X-ray photo electron spectroscopy (XPS), field emission scanning electron microscopy (FESEM), and energy dispersive X-ray spectroscopy (EDS) and proven to have favorable electrocatalytic properties towards water oxidation.

A first aspect of the invention is directed to an electrocatalyst comprising manganese oxide ($MnO_x$) nanoparticles having an average diameter (e.g., crystallite size) in the range of 1 nm to 50 nm, preferably 2 nm to 40 nm, preferably 4-30 nm, preferably 5-25 nm, preferably 8-20 nm, preferably 10-15 nm, or 13-14 nm supported on carbon microparticles. The carbon microparticles preferably have a longest dimension of 2-100 μm, preferably 5-50 μm, preferably 10-40 μm, preferably 15-30 μm, preferably 20-25 μm. The carbon microparticles preferably have a flat platelet-like morphology with a thickness in the range of less than 10 μm, less than 9 μm, less than 8 μm, less than 7 μm, less than 6 μm, less than 5 μm, less than 4 μm, less than 3 μm, or less than 2 μm.

The carbon support, preferably carbon microparticles, for the manganese oxide nanoparticles, was produced by a thermal decomposition of leaves obtained from the *Albizia procera* plant. The method further includes a simple and straight forward technique for the thermal decomposition of a manganese precursor (e.g., manganese acetate) in the presence of a carbon support to prepare nano-manganese oxide/carbon composites. It is noted that the thermal decomposition is cost and time effective technique for the preparation of a good metal oxide for catalytic activities in electrochemical water oxidation. [See M. A. Ahmed Qasem, M. Aziz, A. S. Hakeem, S. A. Onaizi, Preparation of Nano-Co3O4 by Direct Thermal Decomposition of Cobalt (II) Nitrate Hexahydrate for Electrochemical Water Oxidation, Current Nanoscience 14(2) (2018) 154-159; R. Liu, Y. Lin, L. Y. Chou, S. W. Sheehan, W. He, F. Zhang, H. J. Hou, D. Wang, Water splitting by tungsten oxide prepared by atomic layer deposition and decorated with an oxygen-evolving catalyst, Angewandte Chemie International Edition 50(2) (2011) 499-502; and M. A. A. Qasem, A. Khan, S. A. Onaizi, H. D. Mohamed, A. Helal, M. A. Aziz, Effect of $Co(NO_3)_2 \cdot 6H_2O$ thermal decomposition temperature on the nano-$Co_3O_4$ product morphology and electrocatalysis of water oxidation, Journal of Applied Electrochemistry 49(3) (2019) 251-259, each incorporated herein by reference in their entirety]. However, the preparation of manganese oxide over the surface of microcarbon particles efficiently improves its catalytic performance towards electrochemical water oxidation, e.g., water splitting reaction.

Carbon derived from an abundant and environmentally friendly sources, i.e., leaves of *Albizia procera* (Roxb.), was used to prepare manganese oxide/carbon microparticle composites. It is noted that *Albizia procera* (Roxb.) is widely present in tropical areas such as Bangladesh, India, Myanmar, Thailand, Malaysia, Laos, Cambodia, and Vietnam. It is also grown in the Middle East including Saudi Arabia. It is a large, fast-growing tree with an open canopy that is almost evergreen. It produces huge amount of leaves which are generally believed useless (i.e., generates huge amounts of biomass). An immobilization method of forming $MnO_x$ on a carbon scaffold could play an important role for minimizing the cost, activity and stability of electrocatalyst electrodes.

The preferred carbon support is derived from a plant source. In one aspect, the present disclosure relates to a composite containing carbon microparticles obtained from the *Albizia procera* plant. The carbon microparticles are obtained by cleaning and drying *Albizia procera* plant material then heating in an inert atmosphere at a temperature in the range of 200-1,200° C., preferably in the range of 300-1,000° C., preferably in the range of 350-900° C., preferably about 800° C. for a time in the range of 1-10 hours, preferably 2-8 hours, preferably 4-6 hours, and preferably about 5 hours. The plant materials may be leaves, branches, wood, flowers, fruits, seeds, husks, strew, roots, and the like from *Albizia procera* plant.

Preferably the plant material is from the genus *Albizia*, which is a genus of more than 160 species of mostly fast-growing subtropical and tropical trees and shrubs in the subfamily Mimosoideae of the family Fabaceae. The genus is pantropical, occurring in Asia, Africa, Madagascar, America and Australia, but mostly in the Old World tropics. In some locations, some species are considered weeds. They are commonly called silk plants, silk trees, or sirises. In some preferred embodiments, the *Albizia* species is *Albizia procera*, commonly known as white siris. In a particularly preferred embodiment, the plant material is leaves from *Albizia procera*.

In general, the plant material is washed with water and air dried for a time in the range of 12-144 hours, preferably 18-120 hours, preferably 24-96 hours, preferably 36-65, preferably 40-55 hours, preferably about 48 hours. In some embodiments, the air drying time may be more than 144 hours or less than 12 hours depending on the air temperature and humidity. The air dried leaves are further oven dried at a temperature in the range of 70-130° C., preferably 80-120° C., preferably 90-110° C., preferably about 100° C. for a time in the range of 12-144 hours, preferably 18-120 hours, preferably 24-96 hours, preferably 36-65, preferably 40-55 hours, preferably about 48 hours, preferably in the presence of a desiccant. The oven dried leaves are pulverized by any tools available such as but not limited to mortar and pestle, and a homogenizer including kitchen or laboratory blender may be used to grind the dried leaves to obtain a plant material dry fine powder. The pulverized plant material preferably has a particle size of 50-1000 µm, preferably 75-800 µm, preferably 100-600 µm, preferably 150-400 µm, preferably 200-300 µm. Subsequent to heating the material it is subject to one or more of an acid wash and a base wash, preferably an acid wash with hydrochloric, sulfuric, acetic or nitric acid at a concentration sufficient to substantially remove or significantly reduce the amount of ions of metals such as magnesium, sodium, calcium and other kind of metals present in the leaves. The carbon microparticles preferably have a BET surface area in the range of 100-2,500 m²/g, preferably 250-2,000 m²/g, preferably 500-1,500 m²/g, preferably 750-1,000 m²/g, preferably 800-950 m²/g, preferably about 900 m²/g.

As further described below, the mixture of the plant material dry fine powder (carbon microparticles) and the Mn compound is heated under in air. The resulting manganese oxide (MnOx)-doped carbon microparticles may be washed with mineral acid such as but not limited to hydrochloric acid at a concentration in the range of 0.1-2.0 M, preferably 0.5-1.5 M, preferably about 1.0 and deionized water. The washed activated carbon is dried at a temperature in the range of 50-90° C., preferably 55-75° C., preferably 60-70° C., preferably about 60° C. for a time in the range of 10-96 hours, preferably 15-72 hours, preferably 20-36 hours, preferably about 24 hours.

The crystallites of manganese oxide present in the electrocatalyst are preferably of the same phase. The x-ray diffraction (XRD) spectrum preferably shows two peaks associated with the $MnO_x$, i.e., a phase appearing at 2(θ) Bragg angles of about 37° and 42°, preferably the XRD peaks appear a first value of 36-38°, preferably 36.5°-37.5° or about 37°, and a separate distinct second peak appearing at 41-43°, preferably 41.5°-42.5°, or preferably about 42°. The XRD peaks correspond with a manganese oxide cubic phase.

The manganese oxide may take different chemical forms in the electrocatalyst. For example, the manganese oxide may conform to a stoichiometry of $MnO_x$, such as $MnO_2$, $Mn_3O_4$ and the like. The manganese oxide precursor may be a manganese compound, preferably in a +2 oxidation state such as manganese nitrate, manganese sulfate, $MnX_2$ (where X is F, Cl, Br, or I), manganese hydroxide, manganese molybdate, manganese phosphate, and similar inorganic compounds. Organometallic compounds are especially preferred for the synthesis of the manganese oxide doped carbon microparticle electrocatalyst. Compounds such as acetates are especially preferred. However, other carboxylate-type organometallics such as propionate, fumarate, maleate and the like may be used. Ideally the manganese compound has good solubility in a polar organic solvent such as ethanol.

The electrocatalyst is preferably in particulate form containing microparticles of carbon onto which manganese oxide ($MnO_x$) is homogeneously distributed on its surfaces. Preferably the manganese oxide is present only on the surface of the carbon microparticles and is not present within the carbon microparticles. The carbon microparticles may be discrete microparticles such that the electrocatalyst has a particle size that generally corresponds with the particle size and particle distribution of the carbon microparticles used as a precursor. In other embodiments, the electrocatalyst is in the form of micro-particulate agglomerates having variable particle size and containing manganese doped carbon microparticles physically or chemically, e.g., ionically, bonded to one another.

The electrocatalyst may contain one or more binders although it preferably consists of the $MnO_x$ and carbon microparticles. Suitable binders known to one of ordinary skill which are chemically stable in the potential window of use of an electrochemical cell or supercapacitor may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoroethylene copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE). Additionally, water soluble binders including branched polyethyleneimine (bPEI), an ethylene-acrylic acid copolymer such as poly 2-acrylamido-2-methylpropane sulfonic acid (PAMPS) and Nafion may be employed as binder. These binders may be used independently, or mixtures may be used.

In some preferred embodiments, the binder is a conductive polymer, also described as electroactive polymer. The conductive polymers comprise inherently conductive polymers (ICP) and conductive plastics. The latter are traditional plastics, such as thermoplastics, that may include conductive fillers, such as powdered metals or carbon (e.g., carbon black or fiber). The conductive polymer may be a biocompatible conductive polymer that is ionically conductive and that is mechanically stable over a desired period of time, such as, for example, polypyrrole. In further embodiments the conductive polymer may include, for example, polynaphthalene, polythiophene, Nafion, polyethylene oxide, and polyethyldioxythiophene (PEDOT). Other classes of conductive polymers include polyacetylenes, conductive polypyrrole polystyrene sulfonate, polythiophenes (PT), and polyanilines. Conductive polymers may also include EHPT (poly(3-(2-ethylhexyl)thiophene), ionomers (e.g., Nafion®), poly(3,4 ethylene dioxythiophene) (PE-DOT) and PEDOT polystyrene sulfonate (PSS/PEDOT).

In some embodiments of the method, the binder is present in the electrocatalyst in an amount in the range of 0.1-10.0 wt. %, preferably in the range of 0.5-5.0 wt. %, preferably in the range of 1.0-2.5 wt. %, based on the weight of the electrocatalyst.

Another aspect of the invention is directed to a method of making the electrocatalyst. The method may include first preparing the carbon microparticles by grinding dried *Albizia procera* leaves and heating in an inert atmosphere at a temperature in the range of 200-1,200° C. The resultant dried and pulverized plant material is preferably washed with an acid or basic solution and dried to form dried carbon microparticles.

The dried microparticles are preferably suspended or dissolved in an organic solvent having polar character. The preferred organic solvent is ethanol although other alcohols such as methanol, propanol and multi-functional alcohols such as a glycol can be used for this purpose. Examples of suitable solvents include, but are not limited to alcohols such as methanol, ethanol, propanol, isopropanol, and the like, acetone, methyl ethyl ketone, dimethyl ether, methyl ethyl ether, chloroform, methylene chloride, carbon tetrachloride, petroleum ether, and the like. Other organic solvents such as DMSO and the dimethyl pyrrolidone (DMP) may be used. The resulting solution or suspension of carbon microparticles and organic solvent is preferably sonicated to form a stable and homogenous solution or suspension in which the carbon microparticles are evenly distributed and/or suspended. A similar solution or suspension is made of a manganese precursor, in a similar or the same organic solvent used for the carbon microparticles. The manganese-containing precursor solution/suspension is likewise subjected to sonication to form a table solution or suspension of manganese precursor in an organic solvent.

The manganese and carbon microparticle solutions/suspensions are combined and stirred to form a homogeneous mixture which may slowly form a precipitate. The mixture, in combination with any formed precipitate, is dried by removal of solvent and other volatile materials to form a dried mixture which is subject to heating/drying/calcining at an elevated temperature of 200-600° C., preferably 250-500° C. see, preferably 300-400° C. or about 350° C., to form a dry powder representing manganese oxide-doped carbon microparticles which may be distinct or in agglomerated form.

The electrocatalyst described herein is preferably prepared in the absence of a conventional chemical reducing agent such as sodium borohydride.

Likewise, heating the dried mixture in the presence of manganese oxide and carbon microparticles is preferably carried out in the absence of a gaseous reducing atmosphere such as in the absence of a hydrogen-containing atmosphere. Further in this regard the manganese compound that is used as a precursor for the transition metal phosphide may be free of a halogen.

Further with respect to the process of preparing the electrocatalyst, the preparation methodology is preferably carried out in a "one-step" method that essentially represents a thermal decomposition of the manganese compound in the presence of the carbon microparticles in air. In this aspect of the present disclosure the manganese compound does not require a separate reduction or oxidation step in solution.

Final formation of the electrocatalyst is carried out in a manner that includes heating. Preferably the dried material is placed in a first container such as a crucible or other container that is capable of withstanding the temperatures necessary for forming the electrocatalyst.

Preferably the carbon microparticles used as a support for the manganese oxide in the electrocatalyst described herein are not doped with any other material. For example, the carbon microparticles are not doped with other transition metal dopants or main group metal dopants. Likewise, the thermal decomposition preferably forms an electrocatalyst in which the manganese oxide material is the only basis for the presence of manganese on the electrocatalyst.

Another aspect of the invention is directed to a modified electrode comprising an electrically conductive substrate coated with the noble metal free electrocatalyst of the invention. The substrate is any electrically conductive material such as, but not limited to glassy carbon, graphite, gold, platinum, silver, iron, copper, aluminum and the like. The electrode may have any dimension and shape. For example, the shape of electrode may be cylindrical rode or plate, or rectangular sheet or block. In some embodiments, the electrode is cylindrical and has a diameter at least 1, 2, 3, 4, 5, 6, 7, 8, 9, or 10 mm and a surface area of at least 0.05, 0.10, 0.15, 0.20, 0.25, 0.30, 0.35, 0.40, 0.45, 0.50 $cm^2$. The electrode is coated with a composition comprising the electrocatalyst of the invention. The modified electrode has a catalyst loading in the range of 0.1-15 $mg/cm^2$, preferably in the range of 0.2-10 $mg/cm^2$, preferably in the range of 0.3-5 $mg/cm^2$, preferably in the range of 0.5-2 $mg/cm^2$, and preferably about 1.0 $mg/cm^2$ of the surface of the electrode.

In some embodiments, the BET surface area of the modified electrode is in the range of 100 to 300 $m^2g^{-1}$, preferably in the range of 125 to 275 $m^2g^{-1}$, preferably in the range of 140 to 230 $m^2g^{-1}$ preferably in the range of 160 to 180 $m^2g^{-1}$, preferably about 167 $m^2g^{-1}$.

In addition to the large electroactive surface area, the electrode of the invention has many desirable characteristics that enhance its performance in an electrochemical reaction, in particular, the electrolysis reaction of water to produce hydrogen. It has an estimated over potential to produce a current density of 10 $mAm^{-2}$ in acidic condition in the range of 200-50 mV, preferably in the range of 160-70 mV, preferably in the range of 140-90 mV, preferably in the range of 110-100 mV, preferably about 104 mV. Another feature of the electrode of the invention is that it has a charge transfer resistance (Rct) of less than 150 $\Omega cm^2$, preferably less than 100 $\Omega cm^2$, preferably less than 50 $\Omega cm^2$, preferably less than 25 $\Omega cm^2$, preferably less than 15 $\Omega cm^2$, preferably less than 10 $\Omega cm^2$, preferably less than 6 $\Omega cm^2$ at 90 mV. Also, it has a turnover frequency in the range 1.00-0.2 $s^{-1}$, preferably in the range 0.90-0.30 $s^{-1}$, preferably in the range 0.80-0.40 $s^{-1}$, preferably in the range 0.70-0.50 $s^{-1}$, and preferably about 0.55 $s^{-1}$.

Any electrically conductive substrate may be modified to produce the electrode of the invention. Generally the substrate is modified by a coating comprising the electrocatalyst of the present invention and a binder. The catalyst of the invention and a binder may be wet blended in the presence of a suitable solvent or dry blended using a mortar or other conventionally known mixing equipment. The mixture may then be applied to the surface of the substrate by conventionally known methods. Any electrically conductive substrate may be employed. Preferred electrically conductive substrate include but not limited to glassy carbon, graphite, graphene, iron, copper, aluminum, gold, silver, platinum, and the like.

The manganese oxide-doped carbon microparticles may be used as a component of an electrode. The electrode typically contains at least one flexible organic or inorganic substrate, a metal lead and an organic substrate onto which the electrocatalyst deposited. The metal lead may be any of copper, gold, silver or aluminum, preferably copper. Substrates may include polymer substrates such as polyethylene, polycarbonate, nylon, polyethylene terephthalate and the like. The carbon substrate onto which the electrocatalysts is deposited is preferably amorphous in nature and different from the carbon microparticle used to make the manganese-oxide doped carbon microparticle electrocatalyst. Inorganic substrates may include ceramic materials that are insufficiently porous to absorb a solution or suspension of the manganese oxide-doped carbon microparticles to thereby form a "spot" contact portion which serves as the electrode sensor for the electrode.

Another aspect of the invention is directed to an electrochemical cell comprising at least one electrode that includes an electrically conductive substrate coated or containing the electrocatalyst of the invention. Typically, an electrochemical cell comprises a working electrode, a counter electrode and an electrolyte, wherein the electrolyte covers the surfaces of the electrodes. In some preferred embodiments, the electrolyte is aqueous acid or alkali or alkaline earth metal hydroxide solution. Any mineral acid may be utilized such as but not limited to hydrochloric acid, sulfuric acid, and nitric acid. In a preferred embodiment sulfuric acid is used as an electrolyte. Any alkali or alkaline earth metal hydroxide such as but not limited to lithium hydroxide, sodium hydroxide, potassium hydroxide, calcium hydroxide, magnesium hydroxide, and the like may be used as an electrolyte. The concentration of the electrolyte in cell is in the range of 0.1-2.0 M, preferably in the range of 0.2-1.8 M, preferably in the range of 0.3-1.5, preferably in the range of 0.4-1.2, and preferably in the range of 0.5-1.0 M. In particularly preferred embodiments, the electrolyte is sulfuric acid at a concentration of about 1.0 M. In some other preferred embodiment, the electrolyte is potassium or sodium hydroxide at a concentration of about 1.0M.

In some other embodiment, the electrolyte is a solid electrolyte. There are several forms of solid electrolytes that include but are not limited to gel electrolyte and solid electrolyte. Gel electrolytes resemble closely liquid electrolytes. In essence, they are liquids in a flexible lattice framework. They are formed by dissolving a salt in a polar liquid and adding polymer network to give the material mechanical stability. Examples of gel electrolytes include, but not limited to sodium acetate or sulfate/polyvinyl alcohol/polyethylene oxide, lithium trifluoromethane sulfonic acid in poly (vinylidene fluoride), poly(1-vinyl-3-propylimidazolium bis (fluorosulfonyl)imide)/1-ethyl-3-methyl imidazolium bis (fluorosulfonyl)imide (EMIFSI), and the like. Dry polymer electrolytes differ from liquid and gel electrolytes in that salt is directly dissolved into the solid medium. Examples of such polymers include, but not limited to polyethers, polyesters, polyamines, polythiols, polysiloxane, and combination thereof. In order to increase the mechanical strength and conductivity of such electrolytes, composites are used in combination with an inert ceramic phase. There are two major classes of such electrolytes: polymer-in-ceramic and ceramic-in-polymer. In solid ceramic electrolytes, ions migrate through the ceramic phase by means of vacancies or interstitials within the lattice. Also, there are glassy-ceramic electrolytes. Another type of solid electrolyte is an organic ionic plastic crystal which is a type of organic salts exhibiting mesophases, i.e., a state of matter intermediate between liquid and solid. In such an electrolyte, mobile ions are orientationally or rotationally disordered while their centers are located at ordered sites in a crystal structure. They have various forms of disorder due to one or more solid-solid phase transitions below the melting point, and therefore, have plastic properties and good mechanical flexibility as well as improved electrode electrolyte interfacial contact. In particular, protic organic ionic plastic crystals (POIPCs), which are solid protic organic salts formed by proton transfer from a Brønsted acid to a Brønsted base and in essence are protic ionic liquids in the molten state, have found to be promising solid-state proton conductors for fuel cells. Examples include 1,2,4-triazolium perfluorobutanesulfonate and imidazolium methane sulfonate.

In a preferred embodiment, the electrochemical cell is used in a method to produce hydrogen from water. Preferably, sulfuric acid is used as an electrolyte. In some embodiments, sodium or potassium hydroxide is used as an electrolyte. The method involves applying a potential of at least −1.23 V, preferably at least −1.5, preferably at −2.0 V at a temperature of at least 20° C., preferably at least 30° C., preferably at least 40° C., preferably at least 60° C., preferably at least 80° C., and preferably at least 95° C.

EXAMPLES

Experimental Procedure

Materials:

The leaves of *Albizia procera* were collected near from the KFUPM Square of King Fand University of Petroleum and Minerals (KFUPM), Saudi Arabia. Manganese acetate [$Mn(CH_3COO)_2$] was acquired from Sigma-Aldrich and ethanol was purchased from VWR International. The needed de-ionized water was produced by operating a water purification system (Barnstead Nanopure, Thermo Scientific, USA).

Preparation of $MnO_x$NPs-C

Initially, the leaves of *Albizia procera* were properly washed with de-ionized water and were allowed to dry at 110° C. in an electric oven. The dried leaves were then crushed in a simple kitchen blender and sieved for collecting the powder having particle size ≤100 micron. The resultant powder (3 g) was placed in an alumina crucible and was then inserted in the alumina tube of the furnace. In order to make an inert atmosphere, substantial amounts of $N_2$ gas was inserted into the alumina tube for five minutes. After that, the flow of $N_2$ gas was reduced and slowly purged through the tube and the oven started heating at a rate of 10° C./min until the temperature reached 800° C. The temperature was then maintained at this value for five hours. Next, we cooled the furnace to room temperature at a cooling rate of 5° C./min and took out the prepared carbon powder. The carbon powder was then washed with 0.1M HCl (100 ml) to remove the extra entities like magnesium, sodium, calcium and other kind of metals present in the leaves.

Figure 2:
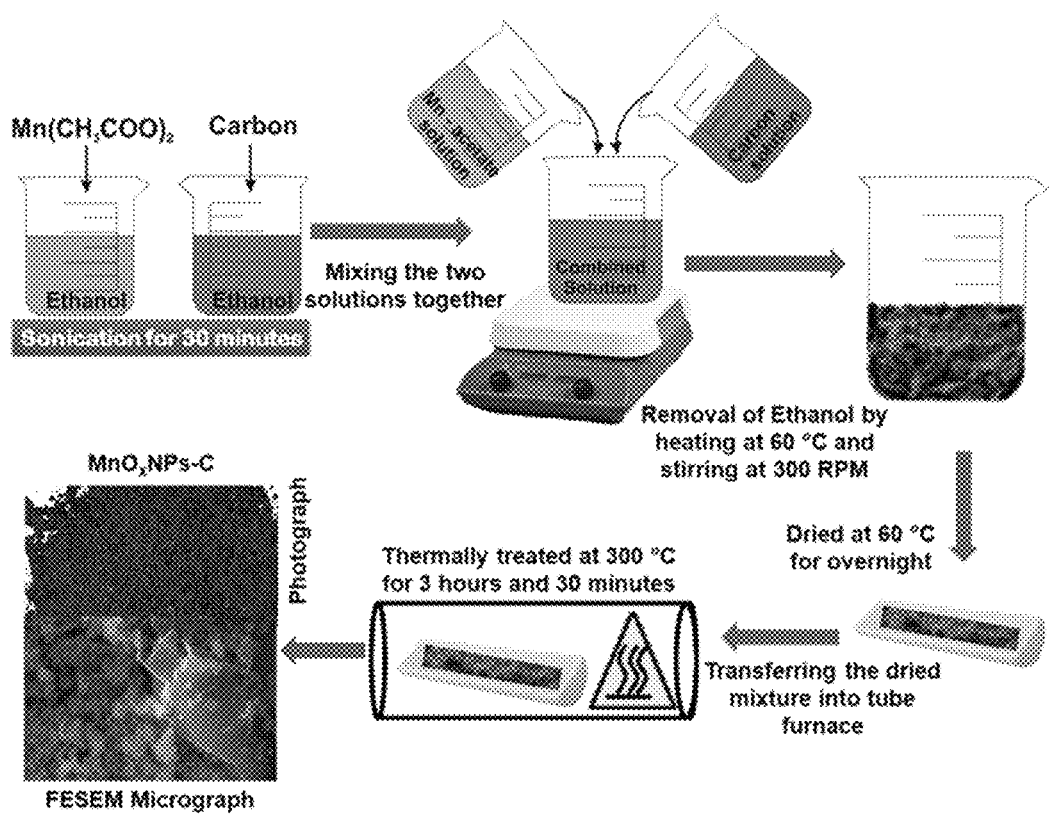
FIG. 2 shows the preparation of manganese oxide and carbon nanocomposite.

For the preparation of $MnO_x$NPs-C using thermal decomposition method, $Mn(CH_3COO)_2$ and the prepared carbon powder were used as the starting materials and ethanol was used as a solvent. In a typical procedure, certain amounts (as shown in Table 1) of $Mn(CH_3COO)_2$ and carbon powder were separately dissolved in ethanol and ultra-sonicated for ~30 minutes. After that, both solutions were combined and thoroughly sonicated at room temperature up to ~30 minutes to get a homogeneous solution. The solution was heated at 60° C. under stirring to remove the ethanol. The final homogeneous mixture was dried at 60° C. for overnight. The schematic for the sample preparation is shown in FIG. 2.

The manganese ions were ligated by the functional group to the carbon, which was then connected with the carbon nanoparticles via noncovalent π-π interaction after sonication. Therefore, the heat treatment of the final mixture will result in the formation of manganese oxide over the surface of the carbon. The completely dried mixture was then thermally treated at 300° C. for 3.5 hours in air in a tube furnace to produce $MnO_x$NPs-C. Here the applied heating and cooling rate were 10° C./min and 5° C./min, respectively.

Preparation of $MnO_x$NPs-C-Modified Filter Paper Derived Carbon Electrode

Figure 3:
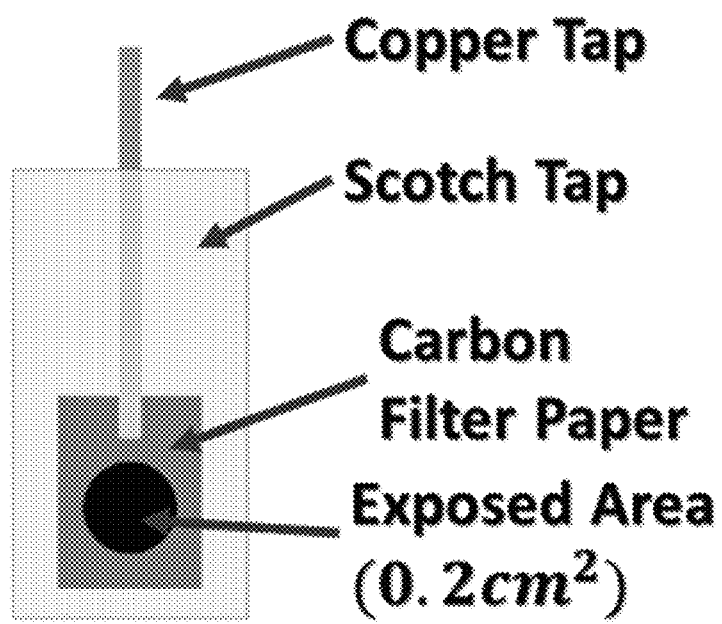
FIG. 3 shows a filter paper derived carbon electrode.

Filter paper derived carbon electrodes (FPCE) were prepared as per Qasem et al. (M. A. A. Qasem, A. Khan, S. A. Onaizi, H. D. Mohamed, A. Helal, M. A. Aziz, Effect of $Co(NO_3)_2 \cdot 6H_2O$ thermal decomposition temperature on the nano-$Co_3O_4$ product morphology and electrocatalysis of water oxidation, Journal of Applied Electrochemistry 49(3) (2019) 251-259—incorporated herein by reference in its entirety). Briefly, 2 cm×2 cm sizes filter papers were heated at 850° C. for 5 hours in nitrogen atmosphere. The obtain filter paper along with the attached copper tap were fixed between scotch taps as shown in FIG. 3. We then immobilized the prepared $MnO_x$-C on FPCE using drop-drying method. For this purpose, a solution of 2 mg/ml was prepared in DI water and was sonicated for 20 minutes. A 30 μl solution was dropped on the exposed area of FPCE and was dried at room temperature to obtain $MnO_x$NPs-C-modified FPCE ($MnO_x$NPs-C/FPCE).

Instrumentation

XRD patterns were recorded using a MiniFlex II desktop X-ray diffractometer equipped with Cu K$\alpha_1$ radiation (=1.54056 Å), installed at the Center of Excellence in Nanotechnology (CENT), KFUPM. The X-ray diffraction patterns were recorded at 2θ ranging from 10°-80° with a scan speed of 2°/min and step size of 0.02°. Furthermore, the values set for voltage and current during operation were 45 kV and 40 mA, respectively. The morphology of the prepared samples was analyzed using an FESEM, (Tescan Lyra-3) at CENT labs, KFUPM. This SEM was operated at 20 kV. The EDS analysis was carried out on a Lyra 3 attachment to the FESEM using LINK INCA program system. The thermogravimetry and differential scanning calorimetry (TGA/DSC) were recorded in CENT, KFUPM by the thermal analyzer STA 449F3-Jupiter by Netzsch, having temperature range from room temperature up to 1650° C. A micro-focusing X-ray monochromator XPS (ESCALAB 250Xi XPS Microprobe, Thermo Scientific, USA) installed in the department of Physics, KFUPM, was applied for the chemical analysis of the prepares sample. All the electrochemical analyses were performed by utilizing a 760E-CHI electrochemical workstation. In these analyses, the prepared FPCE and $MnO_x$NPs-C/FPCE, was used as the working electrode, Ag/AgCl was used as the reference electrode, and the platinum wire was used as the counter electrode. Aqueous solution of 0.1 M NaOH was used as electrolyte. All electrochemical analyses were carried out at room temperature.

Results and Discussion

Different electrode materials were prepared by thermal decomposition method (except C-200 in the Table 1) using various amounts of carbon and $Mn(CH_3COO)_2$. The used amounts of carbon and $Mn(CH_3COO)_2$, and the name of the prepared samples for simple presentation in the rest of the manuscript are given in Table 1.

TABLE 1

List of samples which were prepared using different amount of carbon and $Mn(CH_3COO)_2$, investigated in the present study.

| S. No | Carbon Concentrations | Manganese Acetate Concentrations | Name of the Samples |
|---|---|---|---|
| 1 | 200 mg | No Manganese | C-200 |
| 2 | 200 mg | 500 mg | $MnO_x$-C-500 |
| 3 | 200 mg | 1000 mg | $MnO_x$-C-1000 |
| 4 | 200 mg | 1500 mg | $MnO_x$-C-1500 |
| 5 | No Carbon | 1500 mg | $MnO_x$-1500 |

TGA and DSC

Figure 4A:
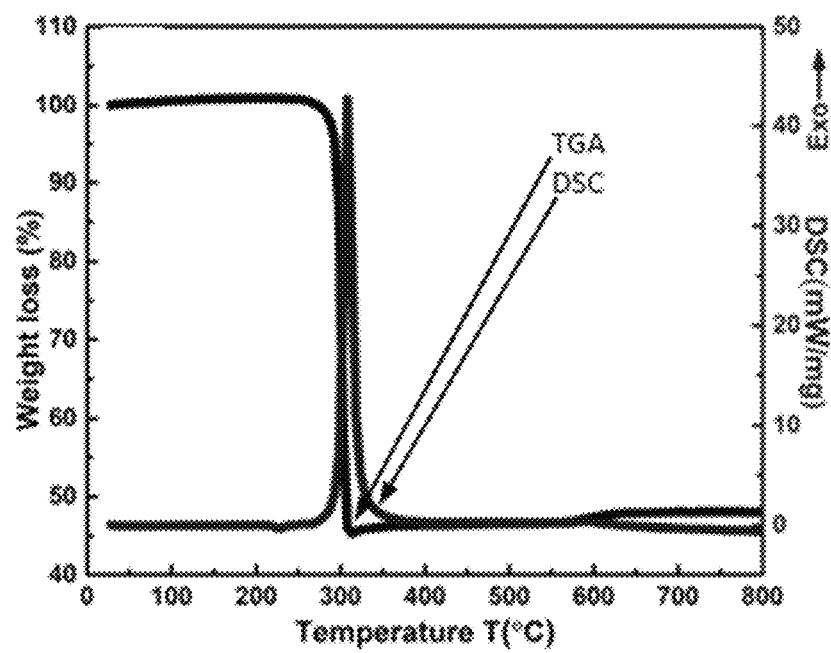
FIG. 4A shows a TGA/DSC curve for pure manganese acetate [Mn(CH$_3$COO)$_2$].
Figure 4B:
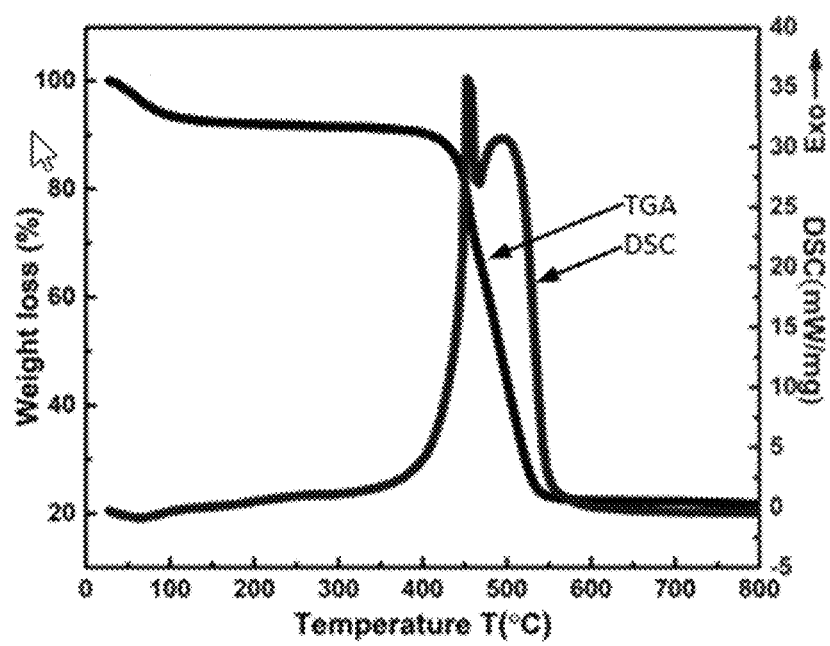
FIG. 4B shows a TGA/DSC curve for pure carbon.

As basis for using 300° C. for the thermal preparation of $MnO_x$-C, thermogravimetric and differential scanning calorimetry experiment was performed. These analyses were carried out at a heating rate of 10° C./minute from 28 to 800° C. in ambient atmosphere. FIG. 4 shows the TGA/DSC curves of (a) pure manganese acetate and (b) pure carbon. The TGA curve in FIG. 4(a) exhibit a major mass-loss, observed between 280 and 300° C. (about 55%). The major loss in the TGA curve is associated with the decomposition of manganese acetate. This observation can be confirmed from the inspection of the associated DSC curve as the major variation was observed on the DSC curve at 300° C. This exothermic peak is assigned to the formation of $Mn_3O_4$. See S. Fritsch, J. Sarrias, A. Rousset, G. Kulkarni, Low-temperature oxidation of $Mn_3O_4$ hausmannite, Materials Research Bulletin 33(8) (1998) 1185-1194; and B. Sahoo, P. K. Panda, Synthesis and characterization of manganese tetroxide ($Mn_3O_4$) nanofibers by electrospinning technique, Journal of Advanced Ceramics 2(1) (2013) 26-30, each incorporated herein by reference in their entirety. The TGA/DSC curve in FIG. 4(b) shows the decomposition of carbon at a temperature higher than 350° C. This result demonstrates the good stability of carbon at 300° C. 300° C. as temperature for preparation of $MnO_x$-C from precursor C and $Mn(CH_3COO)_2$ is acceptable.

Figure 4C:
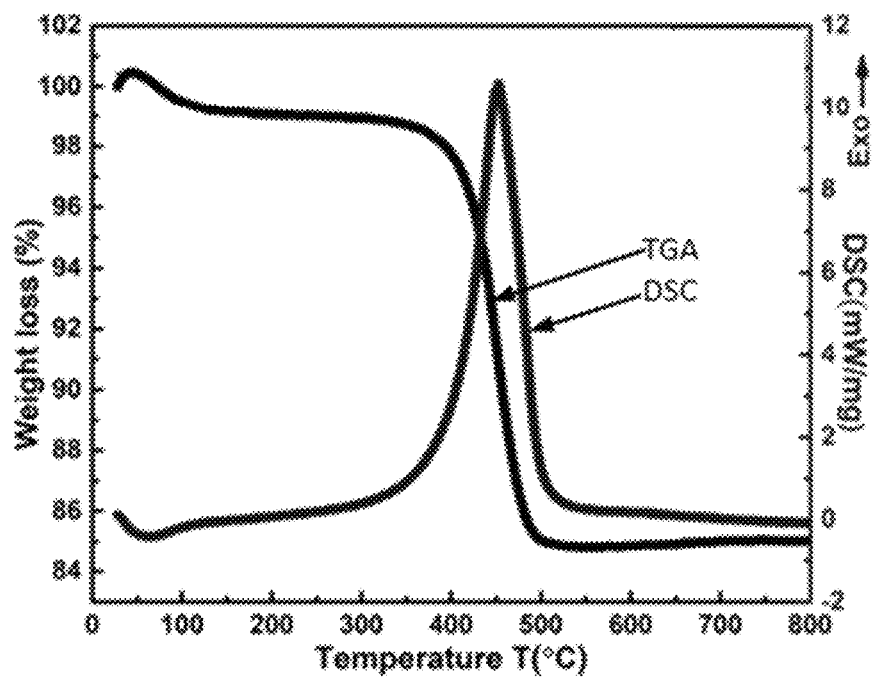
FIG. 4C shows a TGA/DSC curve for MnOx-C-500.

For testing the thermal stability of the prepared $MnO_x$-C, the TGA/DSC data of MnOx-C-500 (symbolic) was recorded, presented in FIG. 4(c). This result reveals that the weight loss occurs between 360° C. and 500° C., which is in comparison with FIG. 4(b). This shows the burning of carbon and phase transformation of $MnO_x$. From these results the as-prepared samples of $MnO_x$-C nanocomposites are highly stable at temperatures lower than 360° C. was shown.

XRD

Figure 5:
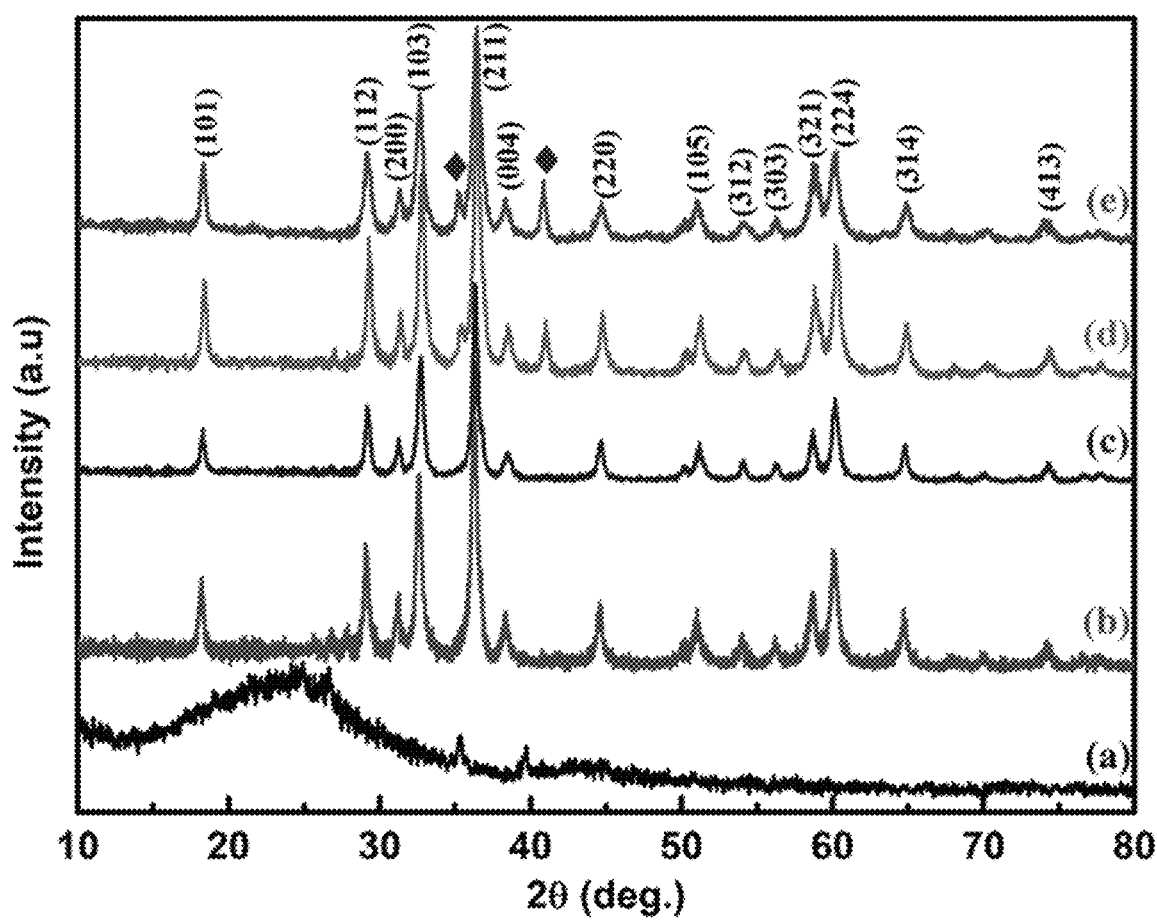
FIG. 5 shows XRD patterns of (a) C-200, (b) MnO$_x$-C-500, (c) MnO$_x$-C-1000, (d) MnO$_x$-C-1500, (e), and MnO$_x$-1500 prepared by thermal decomposition at 300° C. XRD peaks marked with diamond symbols correspond to MnO phase.

FIG. 5 shows the X-ray diffraction patterns of the prepared C-200 (FIG. 5 a), $MnO_x$-C (FIG. 5 b-d) and $MnO_x$-1500 (FIG. 5 e). FIG. 5 (a) shows the XRD pattern of the pure carbon prepared from *Albizia procera* leaves at 850° C. The broad diffraction peak occurring in the 2θ range of 15 to 30° corresponding to (002), and can be attributed to typical activated carbon structure. See X.-Y. Liu, M. Huang, H.-L. Ma, Z.-Q. Zhang, J.-M. Gao, Y.-L. Zhu, X.-J. Han, X.-Y. Guo, Preparation of a carbon-based solid acid catalyst by sulfonating activated carbon in a chemical reduction process, Molecules 15(10) (2010) 7188-7196, incorporated herein by reference in its entirety. Spectra (b) and (c) verify the single-phase formation of Hausmannite, tetragonal $Mn_3O_4$ while spectrum (d) and (e) verify the formation of Hausmannite, tetragonal $Mn_3O_4$ along with small amounts of cubic MnO. The XRD peaks observed at 2θ values of 18°, 30°, 31°, 32°, 36°, 38°, 44°, 51°, 54°, 56°, 59°, 60°, 65°, and 74° correspond to (004), (101), (103), (105), (112), (200), (211), (220), (224), (303), (312), (314), (321), and (413) planes of single phase hausmannite, $Mn_3O_4$ tetragonal structure (JSCPDS card No. 01-071-6262). For the high concentration of manganese acetate (1500 mg), small amounts of impurity phase is also present along with hausmannite, $Mn_3O_4$ tetragonal phase. These extra XRD peaks observed at 2θ values of 37° and 42° correspond to MnO cubic phase (JSCPDS card No. 01-075-0625). Debye-Scherrer's formula (eq. 1) was used to determine the average crystallite size (d) for the synthesized $Mn_3O_4$ nanoparticles by utilizing the XRD peak (211):

$$d = \frac{k\lambda}{\beta \cos\theta} \quad (1)$$

where, θ is the Bragg angle, λ is the X-ray wavelength for Mini XRD, Cu Kα (=1.54178 Å), k is the Scherrer's constant (=0.9), and β is the average full-width at half maximum (FWHM). See A. Monshi, M. R. Foroughi, M. R. Monshi, Modified Scherrer equation to estimate more accurately nano-crystallite size using XRD, World Journal of Nano Science and Engineering 2(3) (2012) 154-160, incorporated herein by reference in its entirety. The crystallite size of the samples, $MnO_x$-C-500, $MnO_x$-C-1000, $MnO_x$-C-1500, and $MnO_x$-1500 were calculated as 15 nm, 18 nm 14 nm, and 13 nm respectively. This shows that crystallinity of the particles improves as concentration of manganese increased from 500 mg to 1000 mg. But by further increase in concentration of manganese the crystallinity decreases due to the formation secondary phase (MnO).

FESEM

Figure 6A:
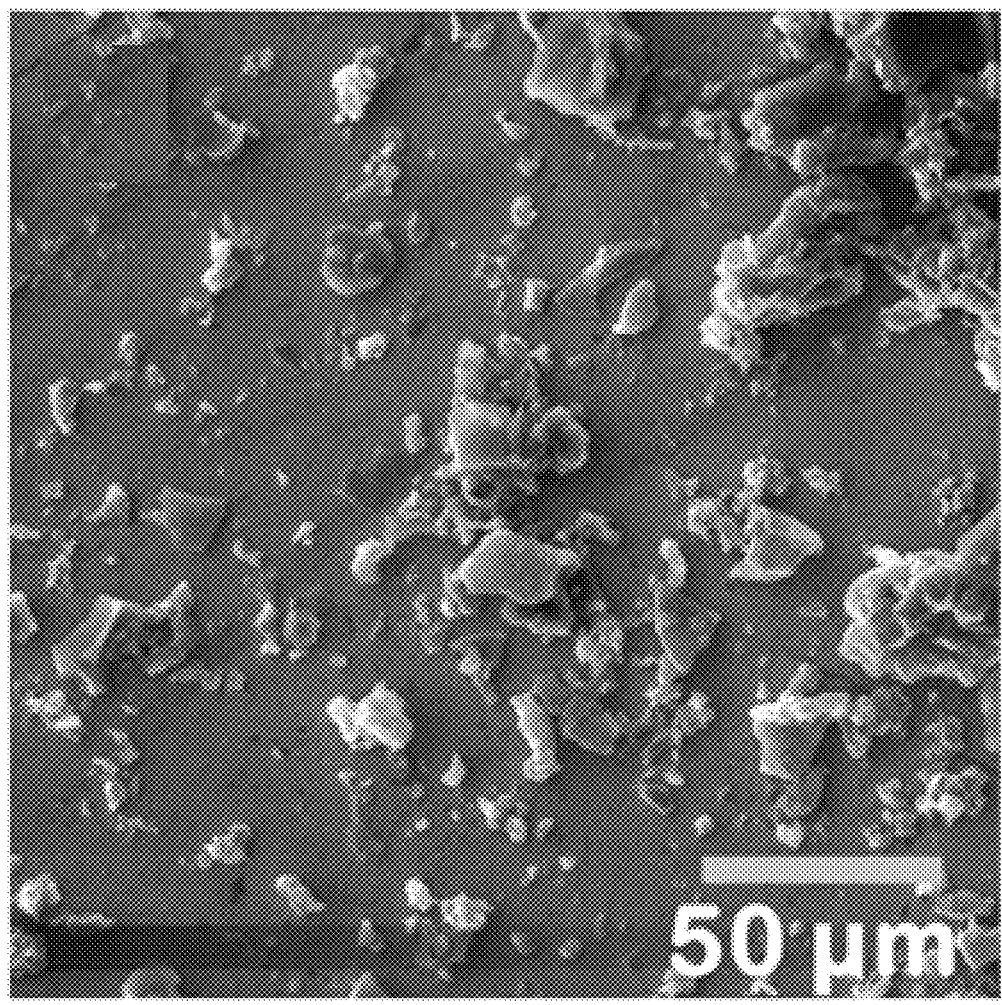
FIG. 6A shows FESEM images of C-200 at low magnification prepared by thermal decomposition at 300° C.
Figure 6B:
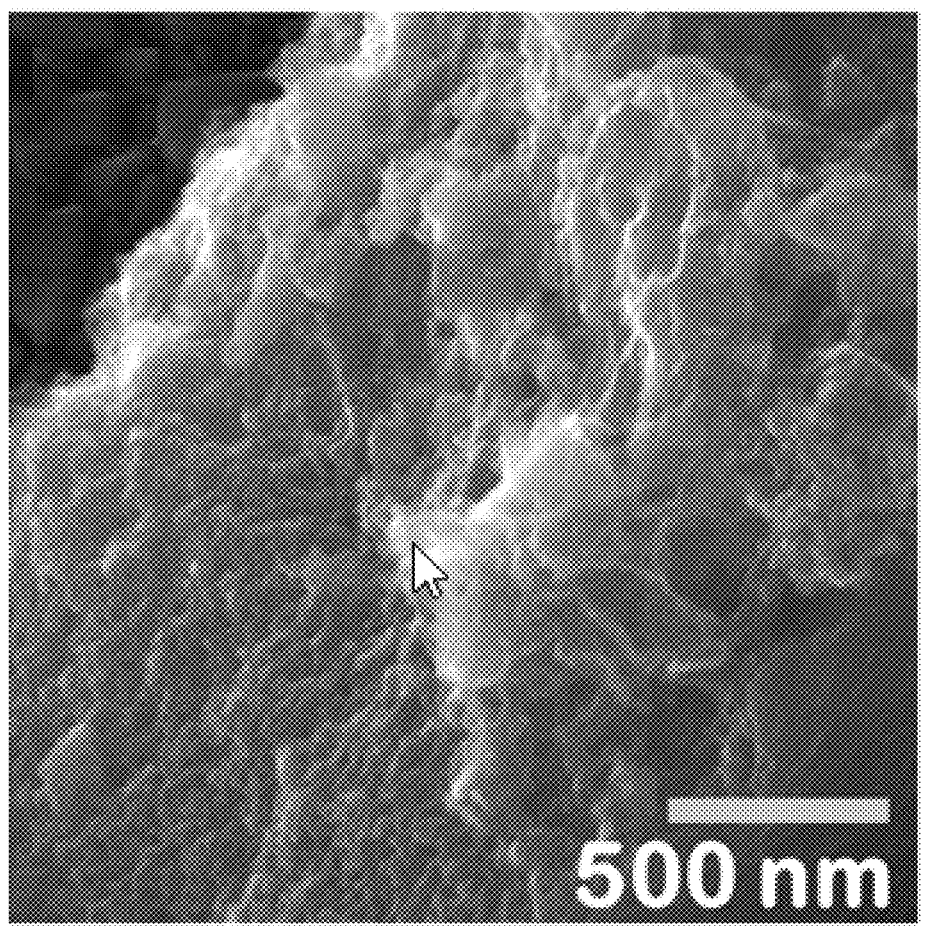
FIG. 6B shows FESEM images of C-200 at high magnification prepared by thermal decomposition at 300° C.
Figure 6C:
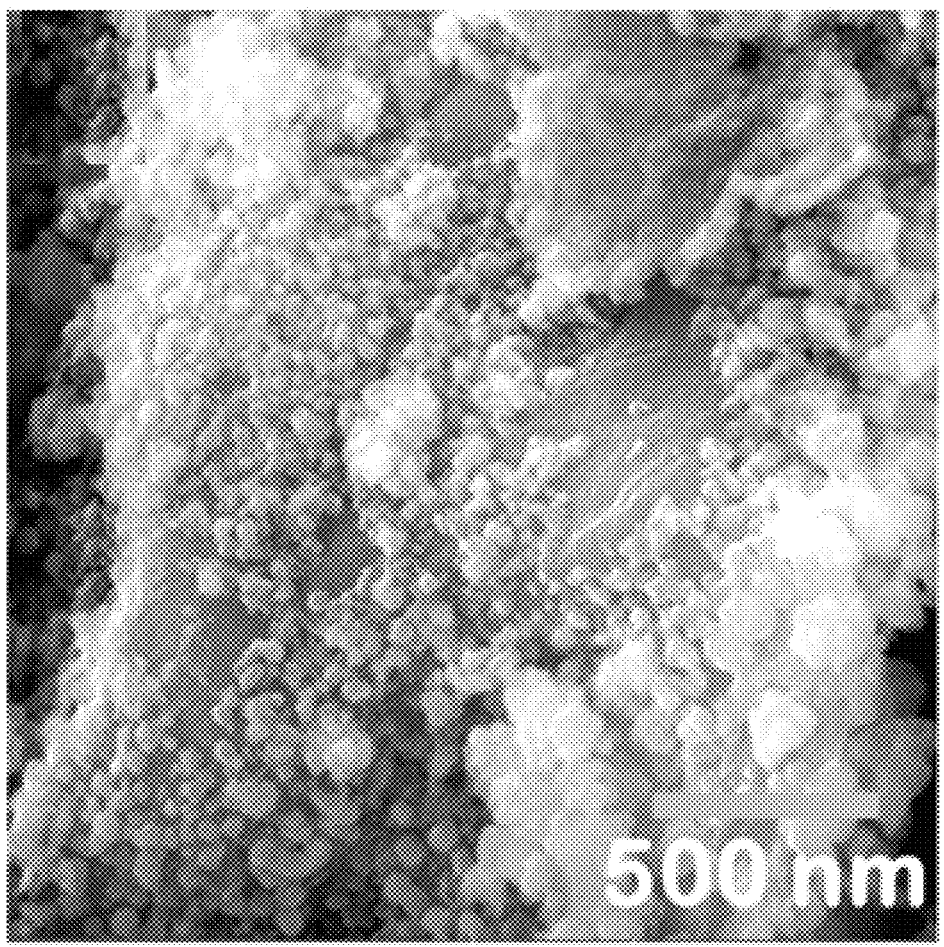
FIG. 6C shows FESEM images of MnO$_x$-C-500 prepared by thermal decomposition at 300° C.
Figure 6D:
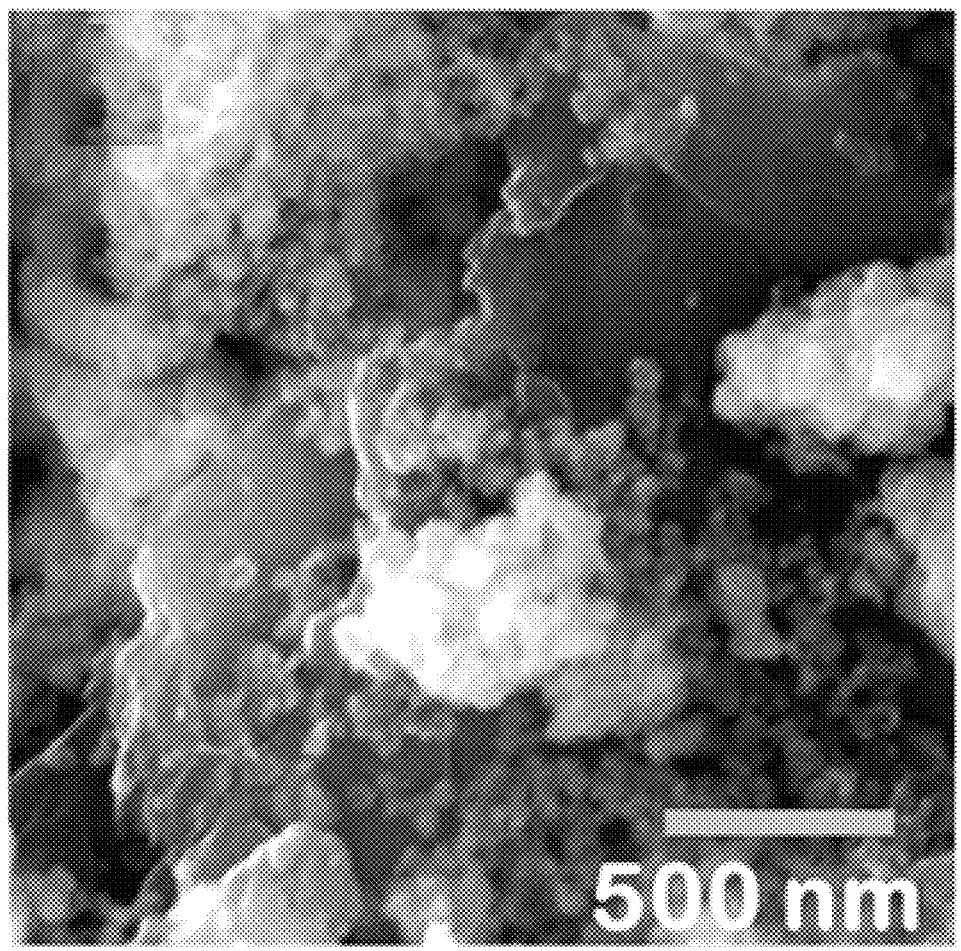
FIG. 6D shows FESEM images of MnO$_x$-C-1000 prepared by thermal decomposition at 300° C.
Figure 6E:
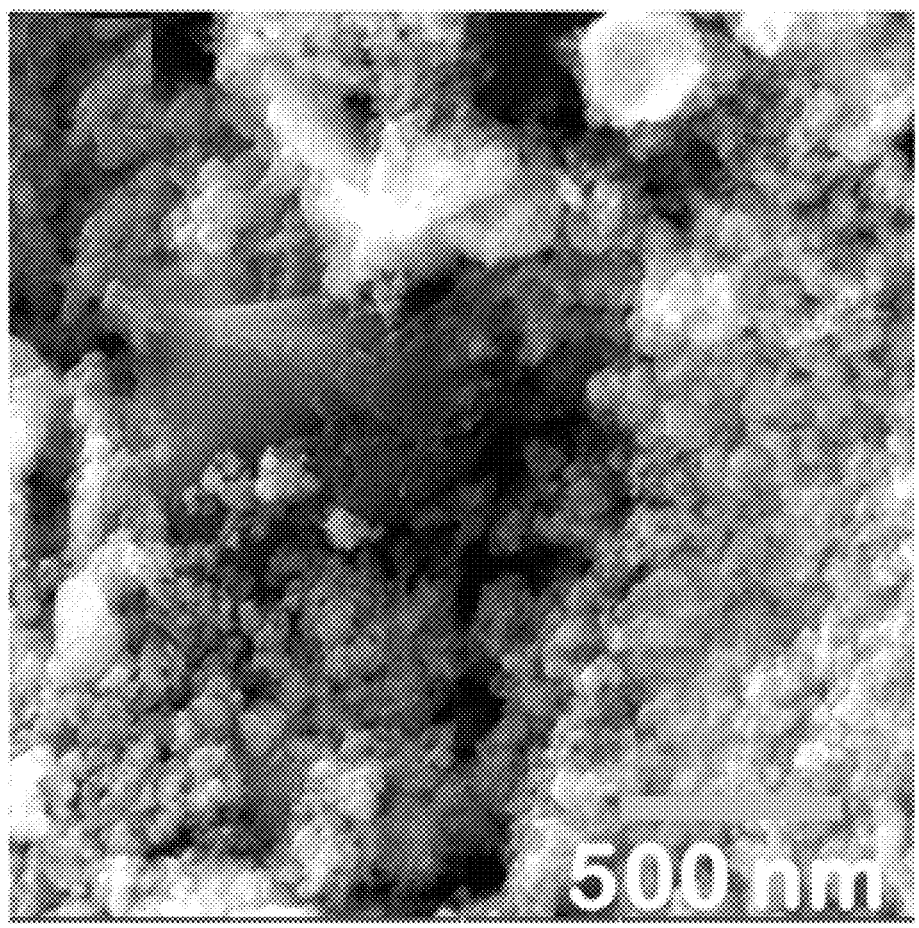
FIG. 6E shows FESEM images of MnO$_x$-C-1500 prepared by thermal decomposition at 300° C.
Figure 6F:
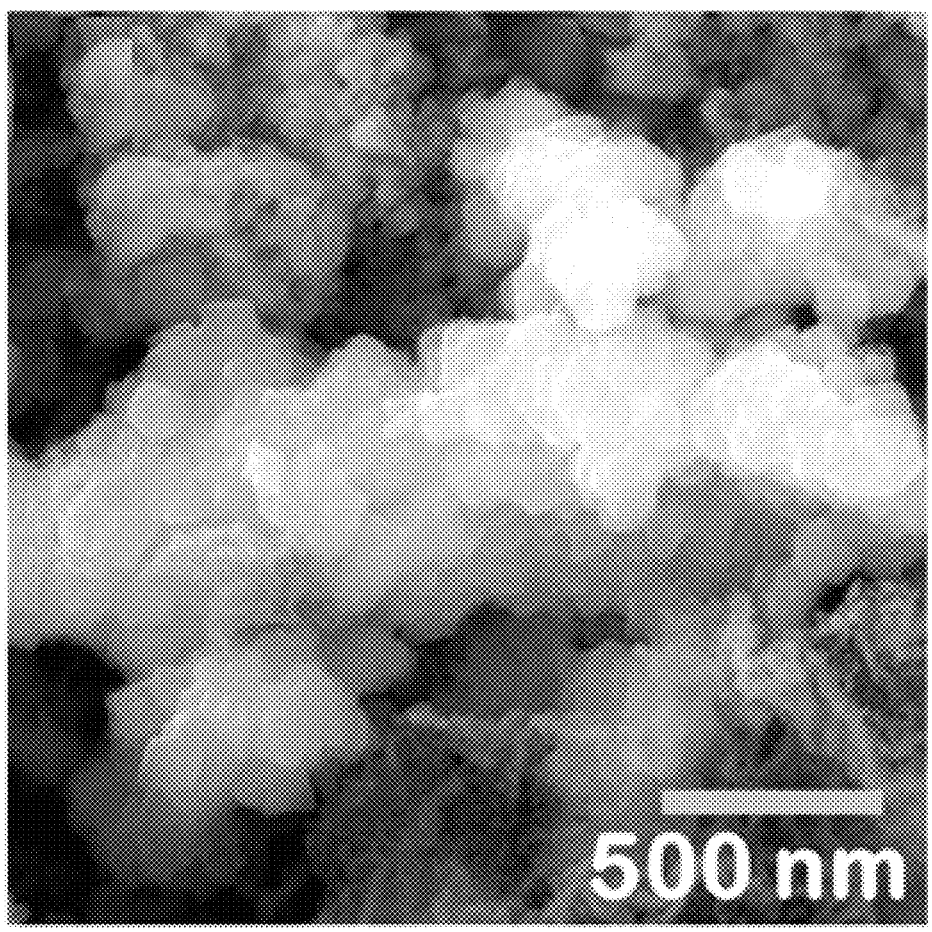
FIG. 6F shows FESEM images of MnO$_x$-1500 prepared by thermal decomposition at 300° C.

FESEM was used to characterize the morphology of the carbon, as-synthesized $MnO_x$-C, and $MnO_x$-1500. FIG. 6 shows the FESEM micrographs of the samples; C-200 (FIG. 6A-B), $MnO_x$-C-500 (FIG. 6C), $MnO_x$-C-1000 (FIG. 6D), $MnO_x$-C-1500 (FIG. 6 e), and $MnO_x$-1500 (FIG. 6 f). The average particle size of C-200 (FIG. 6A) was measured using ImageJ software and was found to be ~12 μm. FIG. 6(B) shows the high magnification FESEM image of C-200, which suggests that the surface of the pure carbon is relatively smooth and has nanoparticles/nanosheets imbedded in it. While the other FESEM micrographs suggest that higher concentrations of the manganese precursor resulted in the formation of more nanoparticles, leading to agglomeration. A careful inspection of these micrographs demonstrates that $MnO_x$ nanoparticles are uniformly distributed on the surface of the supporting carbon in $MnO_x$-C-500, $MnO_x$-C-1000, and $MnO_x$-C-1500 (FIG. 6(B-E)). FIG. 6(F) shows the FESEM image of the $MnO_x$-1500, which are synthesized without the supporting carbon materials under the same experimental conditions. The micrograph shows only agglomerated nanoparticles having ill-defined and irregular morphology formed under the applied experimental conditions. Besides, the particle sizes of the $MnO_x$-1500 are quite bigger than that of the particles sizes of the $MnO_x$ formation in the presence of carbon. From these results of FESEM images, the prepared low-cost carbon can be used as the scaffolder/support of $MnO_x$ nanoparticles preparation, by simple thermal decomposition method.

EDS and Mapping

Figure 7A:
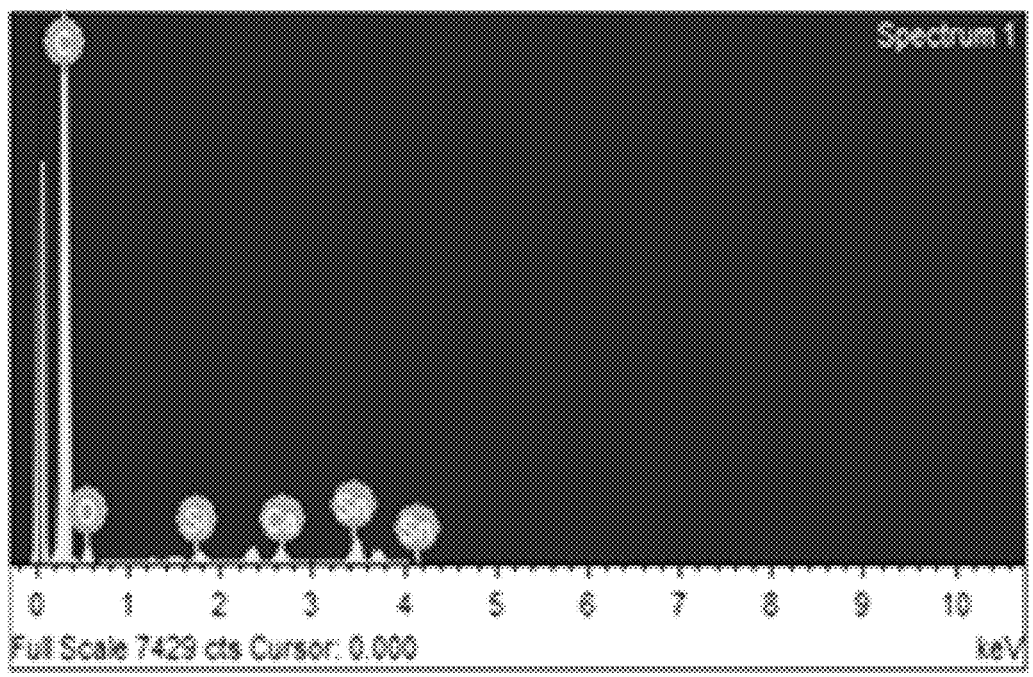
FIG. 7A shows EDS spectrum of C-200.
Figure 7B:
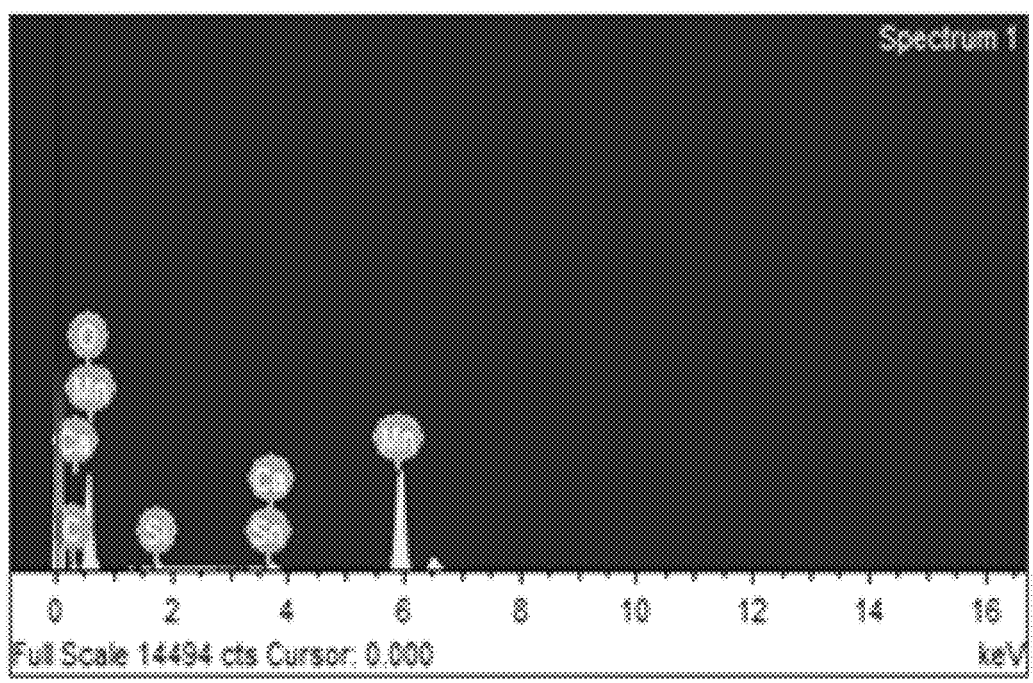
FIG. 7B shows EDS spectrum of MnO$_x$-C-1500.
Figure 7C:
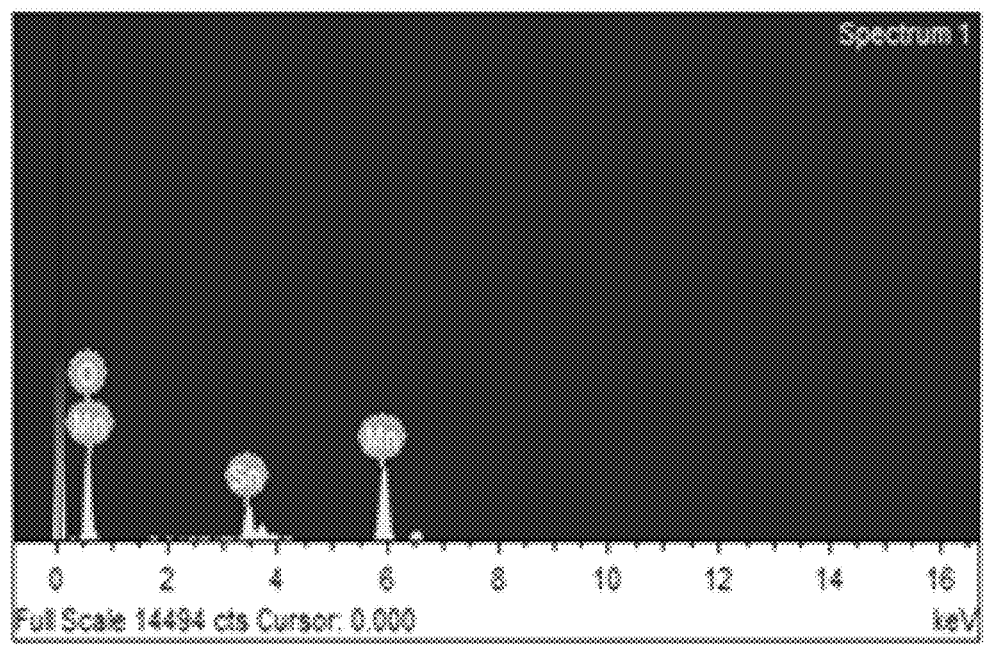
FIG. 7C shows EDS spectrum of MnO$_x$-1500.
Figure 7D:
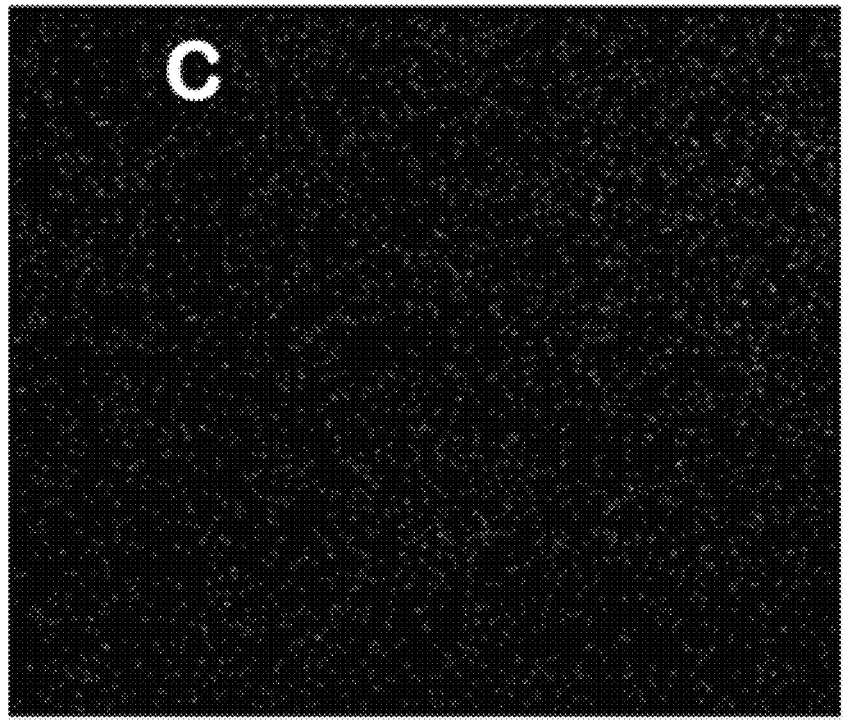
FIG. 7D shows FESEM-EDS elemental mapping of carbon in MnO$_x$-C-1500.
Figure 7E:
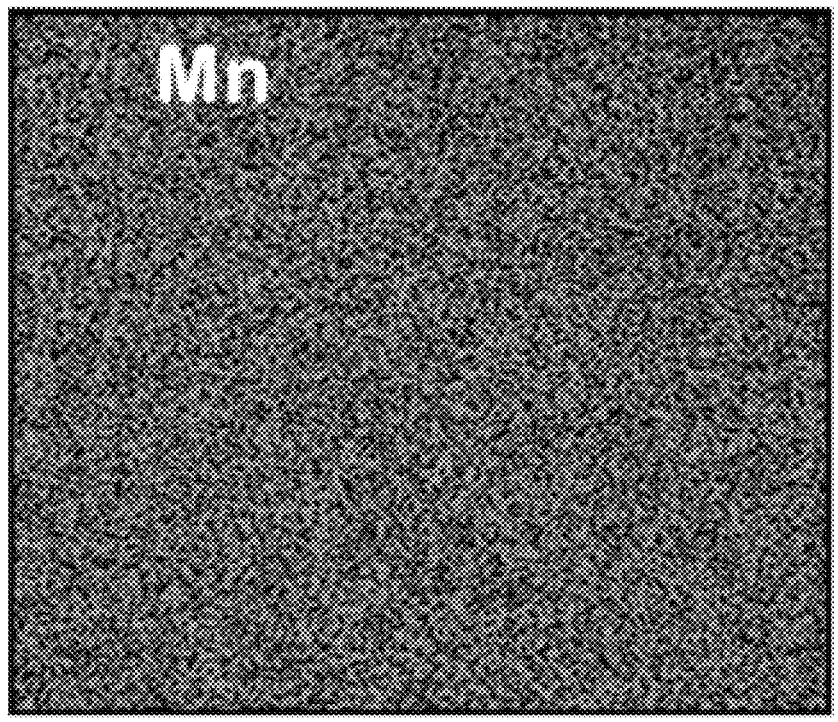
FIG. 7E shows FESEM-EDS elemental mapping of manganese in MnO$_x$-C-1500.
Figure 8A:
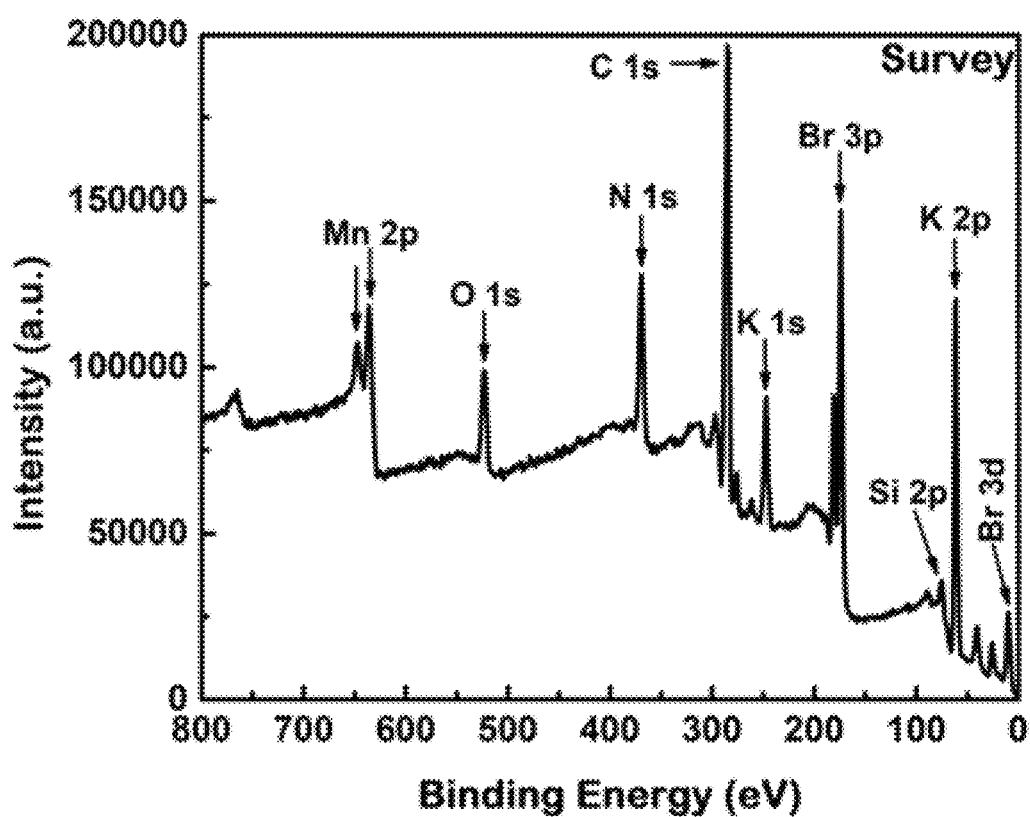
FIG. 8A shows a high-resolution XPS survey profile of constituent elements of MnO$_x$-C-1500.
Figure 8B:
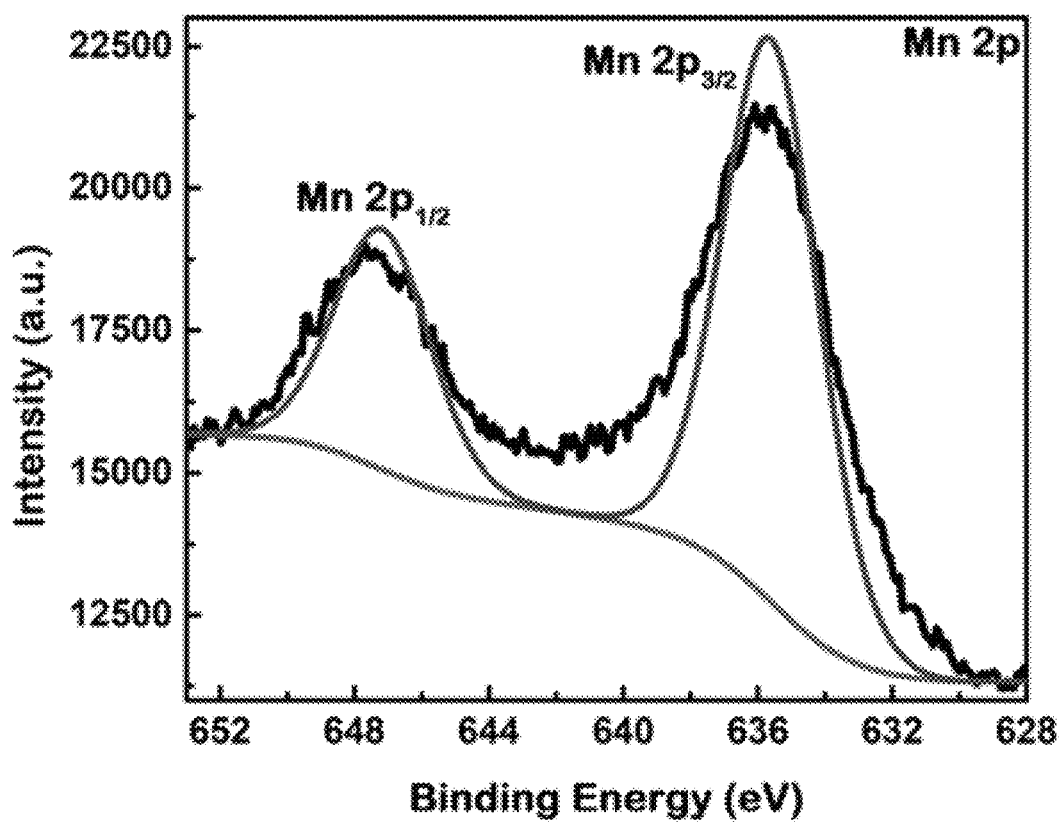
FIG. 8B shows Mn2p deconvoluted peak shown in FIG. 8A.
Figure 8C:
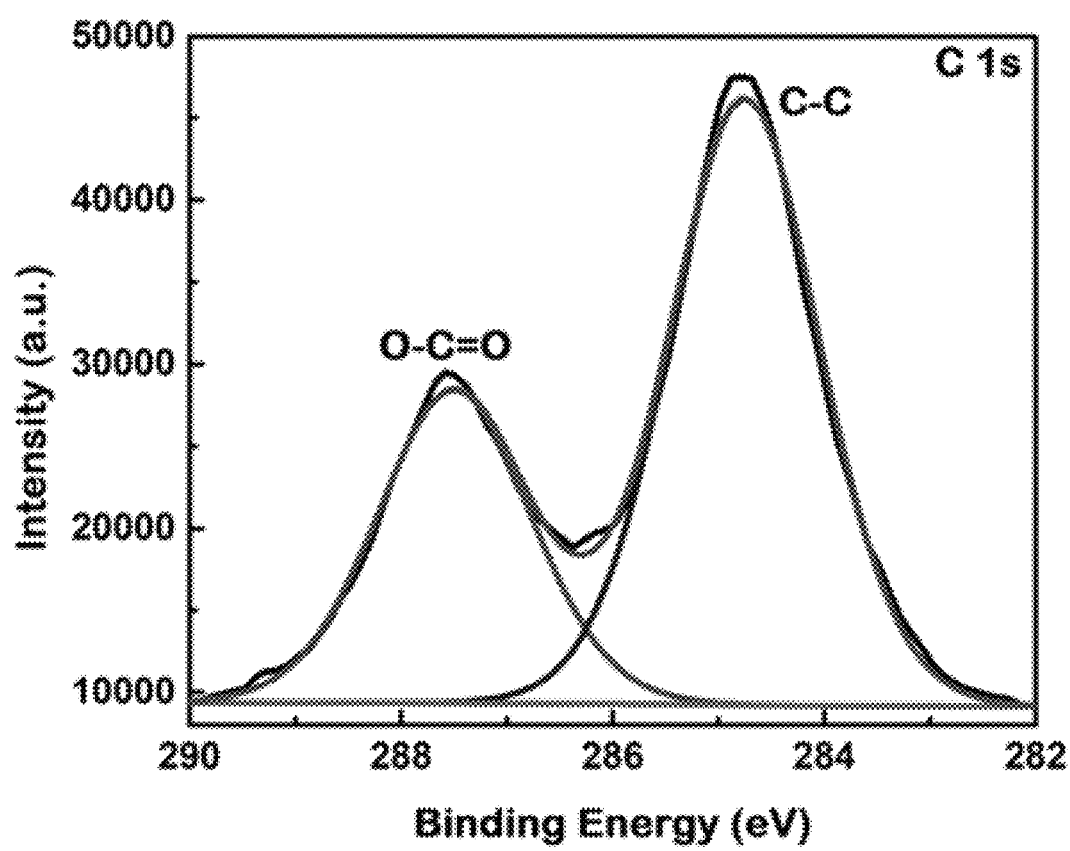
FIG. 8C shows C1s deconvoluted peaks shown in FIG. 8A.
Figure 8D:
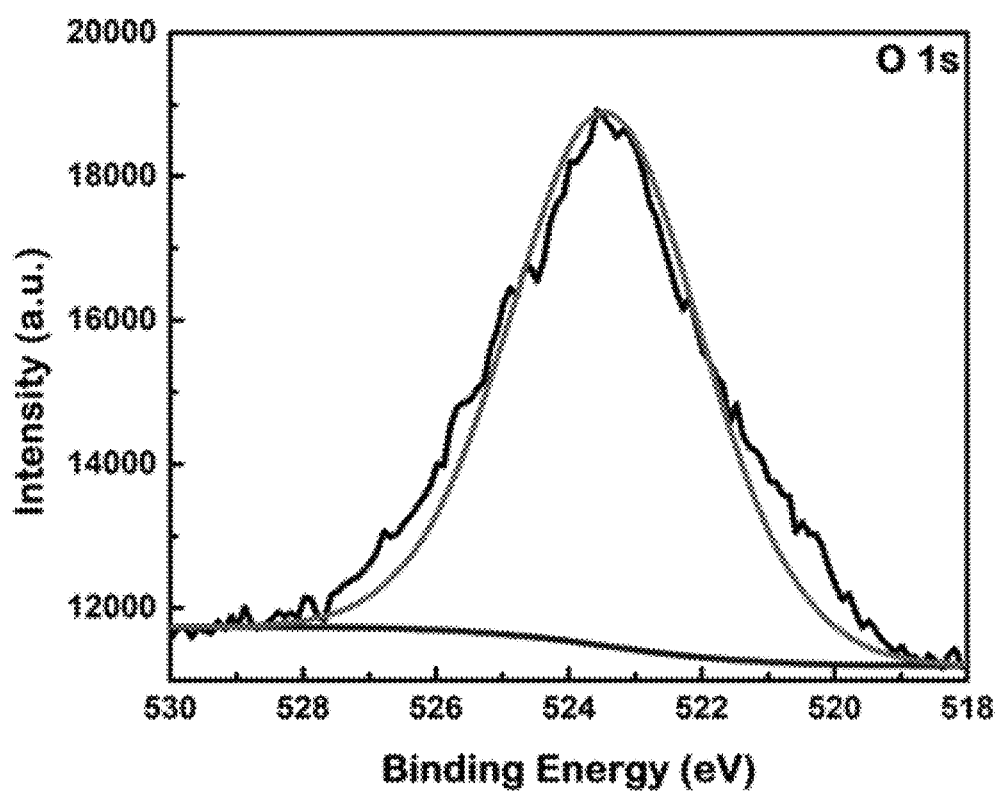
FIG. 8D shows O1s deconvoluted peaks shown in FIG. 8A.

Energy Dispersive Spectroscopy (EDS) analysis was performed, to check the chemical composition of the synthesized $MnO_x$-C nanocomposites and $MnO_x$ nanoparticles. FIG. 7 shows the EDS spectra of (a) C-200, (b) $MnO_x$-C-1500, and (c) $MnO_x$-1500. FIG. 7(A) shows the presence of basically C with presence of small amounts of O, Ca, and Si which might come from the leaves of Albizia procera (Roxb.). See E. Harada, A. Hokura, I. Nakai, Y. Terada, K. i. Baba, K. Yazaki, M. Shiono, N. Mizuno, T. Mizuno, Assessment of willow (Salix sp.) as a woody heavy metal accumulator: field survey and in vivo X-ray analyses, Metallomics 3(12) (2011) 1340-1346, incorporated herein by reference in its entirety. Trace amounts of Ca and Si remained even after acid (0.5 M HCl) treatment. There is another peak, for Sn which is present in entire tested samples, which is related to the substrate materials fluorine doped tin oxide (FTO). Actually, all types of the samples were drop-dried on FTO substrates for FESEM and EDS analysis. FIG. 7(B) shows the presence of the expected elements, Mn, O, and C with tiny amounts of Si in the prepared MnOx-C-1500 sample. Whereas, FIG. 7(C) shows the presence of only Mn and O, as no carbon was used for preparing this sample. This experiment confirmed the chemical composition of C, $MnO_x$-C-1500, and $MnO_x$-1500 nanoparticles which formed at 300° C. Due to the limitations of quantitative EDS analysis, the detailed study for the trace elements was carried out by XPS analysis (presented in the later section). The FESEM-EDS elemental mapping for the prepared $MnO_x$ nanoparticles on carbon were recorded and are shown in FIGS. 7(D and E). FIG. 7D represents the FESEM-EDS elemental mapping of carbon in MnOx-C-1500 and FIG. 7E represents the FESEM-EDS elemental mapping of manganese in MnOx-C-1500. The elemental mapping confirms the uniform distribution of Mn (i.e. $MnO_x$) nanoparticles and carbon throughout the sample.

XPS Analysis

XPS analysis was carried out for further investigation of the chemical states and detailed composition of the constituent elements in the sample, as shown in FIG. 8 (a-d). The sample for XPS analysis was prepared by mixing the prepared $MnO_x$-C-1500 with KBr and subsequent formation of pellet by hydraulic press. After 30 seconds surface etching the high-resolution XPS profile survey was acquired. The profile shows the existence of Mn, O, and C in the sample. The presence Mn, O, and C reflect the nature of $MnO_x$-C-1500 sample. As the carbon is prepared from natural plant, the presence of Si, and N as dopants in the carbon appeared during the XPS analysis. For a comprehensive evaluation of oxidation states and the chemical environment of each element, the peaks corresponding to Mn2p, C1s, and O1s were deconvoluted and fitted. As shown in FIG. 8b, the XPS spectra for the Mn2p of the composite exhibit two peaks at ~635.7 and ~647.3 eV, corresponding to the $Mn2p_{3/2}$ and $Mn2p_{1/2}$ states of $Mn_3O_4$, respectively. It is observed that there is an energy separation of ~11.6 eV between the $Mn2p_{1/2}$ and $Mn2p_{3/2}$ peaks. See Y. Li, J. Qu, F. Gao, S. Lv, L. Shi, C. He, J. Sun, In situ fabrication of $Mn_3O_4$ decorated graphene oxide as a synergistic catalyst for degradation of methylene blue, Applied Catalysis B: Environmental 162 (2015) 268-274, incorporated herein by reference in its entirety. The C1s deconvolution spectrum of the $MnO_x$-C-1500 composite is analyzed by curve fitting, shown in FIG. 7c. The spectrum reveals the presence of two components of the carbon bond: C—C (284.8 eV) and O—C═O (287.5 eV), which are in good agreement with the literature values on plant leaf-derived carbon. See Li et al.; and P. Roy, A. P. Periasamy, C. Chuang, Y.-R. Liou, Y.-F. Chen, J. Joly, C.-T. Liang, H.-T. J. N. J. o. C. Chang, Plant leaf-derived graphene quantum dots and applications for white LEDs, 38(10) (2014) 4946-4951, each incorporated herein by reference in their entirety. In the case of oxygen (FIG. 8d), the peaks for O1 s centered at 523.5 eV corresponds to Mn—O—Mn, and O—C. See M. Risch, K. A. Stoerzinger, B. Han, T. Z. Regier, D. Peak, S. Y. Sayed, C. Wei, Z. Xu, Y. Shao-Horn, Redox processes of manganese oxide in catalyzing oxygen evolution and reduction: An in situ soft X-ray absorption spectroscopy study, The Journal of Physical Chemistry C 121 (33) (2017) 17682-17692, incorporated herein by reference in its entirety. The presence of Mn—O—Mn indicates the existence of $Mn_3O_4$, in full agreement with the XRD results.

Electrocatalytic Activities

Figure 9A:
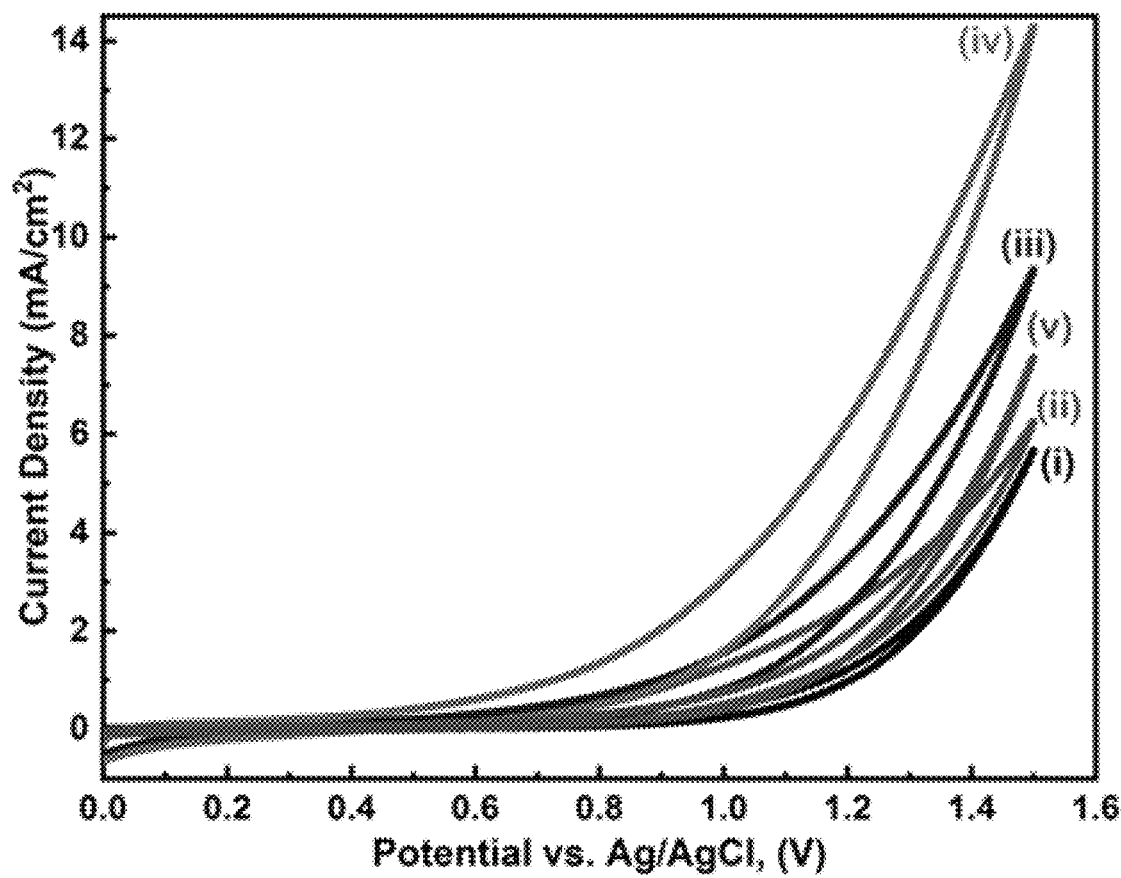
FIG. 9A shows cyclic voltammograms of: (i) FPCE, (ii) MnO$_x$-C-500/FPCE, (iii) MnO$_x$-C-1000/FPCE, (iv) MnO$_x$-C-1500/FPCE in 0.1 M NaOH and (v) MnO$_x$1500/FPCE
Figure 9B:
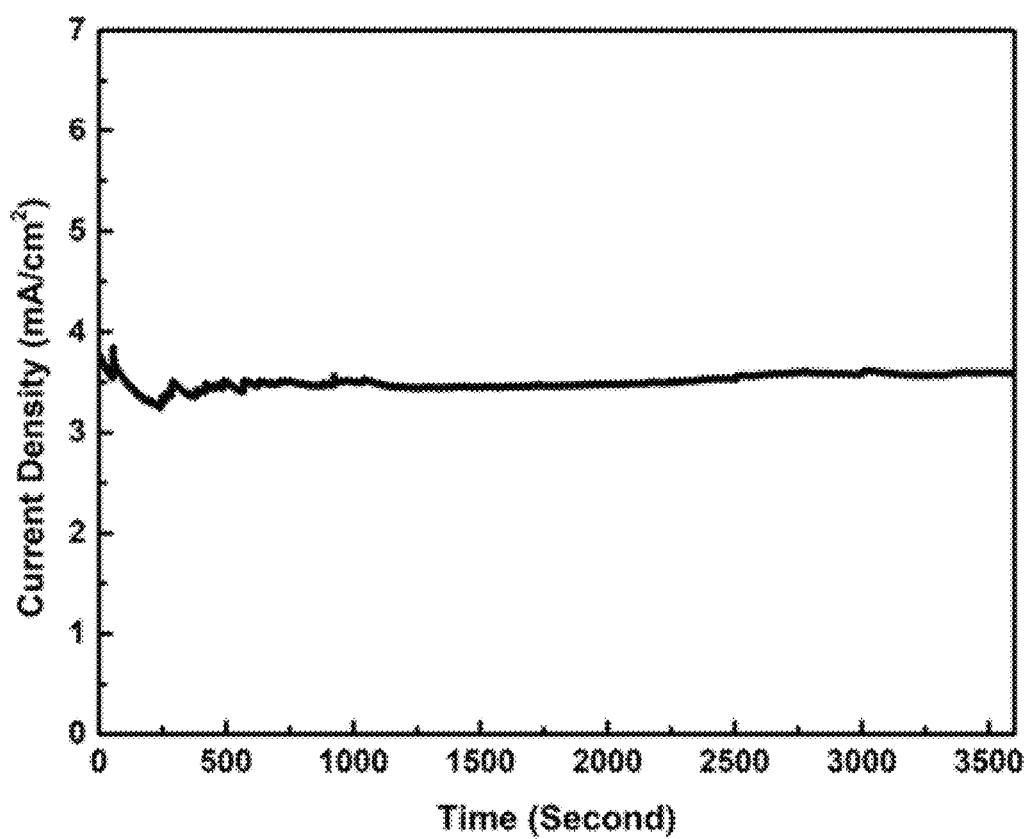
FIG. 9B shows current density stability of MnO$_x$-C-1500/FPCE at 0.9 V in NaOH.

FIG. 9(a) represents the cyclic voltammograms (CVs) of the prepared samples, collected in 0.1 M NaOH (PH=13) electrolyte. From these results, good behavior of the prepared $MnO_x$-C samples towards electrochemical water oxidation is seen. The achieved current densities for (i) FPCE, (ii) $MnO_x$-C-500/FPCE, (iii) $MnO_x$-C-1000/FPCE, (iv) $MnO_x$-C-1500/FPCE, and (v) $MnO_x$-1500/FPCE at 1.5 V are approximately 5, 6, 9, 14, and 8 $mAcm^{-2}$ respectively. Whereas, the water oxidation potential for i) FPCE, (ii) $MnO_x$-C-500/FPCE, (iii) $MnO_x$-C-1000/FPCE, (iv) $MnO_x$-C-1500/FPCE, and (v) $MnO_x$-1500/FPCE are approximately 0.8, 0.6, 0.4, 0.3, and 0.7 V respectively. By considering the starting potential of water oxidation and water oxidation current, it can be concluded that FPCE without any of the prepared C, $MnO_x$-C and $MnO_x$ samples was least active for electrochemical water oxidation and activity increased with increasing manganese content in the carbon supported sample. One the other hand, the $MnO_x$ sample prepared without the carbon support shows the least catalytic activity towards water oxidation. This may be because of the agglomeration of the nanoparticles and formation of bigger particles without carbon support. Based on the current densities and water oxidation potential, $MnO_x$-C-1500 sample in NaOH solution is a catalyst for water oxidation among the prepared C, $MnO_x$-C and $MnO_x$ samples. The stability of $MnO_x$-C-1500 in NaOH solution was performed at 0.9 V for 3600 seconds. FIG. 9 (B) represents the stability profile of the sample and shows good stability of the catalyst for electrochemical water oxidation. To further evaluate the optimum catalyst, the catalytic properties of the prepared electrodes toward electrochemical water oxidation was compared in Table 2 in terms of current densities at 1.5 V, starting potentials, and overpotentials at 5 $mA/cm^2$ determined from FIG. 9A. By considering the above-mentioned parameter, $MnO_x$-C-1500/FPCE is best among the prepared electrodes for electrochemical water oxidation. These result shows that the catalyst, $MnO_x$-C-1500 upon immobilization on the FPCE is capable of sustaining water oxidation for many practical applications such as production of clean $H_2$ and $O_2$, and reduction of $CO_2$ to valuable renewable fuel.

TABLE 2

Comparison of the prepared electrodes in terms of current densitis at 1.5 V, onset potentials, overpotentials at 5 $mA/cm^2$, and Tafel slopes for electrochemical water oxidation.

| Types of Electrodes | Current density at 1.5 V ($mA/cm^2$) | Starting potential for water oxidation (mV vs. Ag/AgCl) | Overpotential at 5 $mA/cm^2$ (mV vs. Ag/AgCl) |
|---|---|---|---|
| FPCE | 5 | 774 | 699 |
| MnOx-C-500/FPCE | 6 | 610 | 819 |
| MnOx-C-1000/FPCE | 9 | 430 | 871 |
| MnOx-C-1500/FPCE | 14 | 310 | 824 |
| MnOx-1500/FPCE | 8 | 658 | 745 |

$MnO_x$NPs-C nanocomposites were prepared using a thermal decomposition technique. The desired $MnO_x$NPs on carbon were prepared by calcining the mixture of C and $Mn(CH_3COO)_2$ at 300° C. for three hours. Different amounts of $Mn(CH_3COO)_2$ with a constant amount of C were used to prepare $MnO_x$NPs-C nanocomposites. The prepared samples were characterized thoroughly by using SEM, XRD, TGA/DSC, and XPS. The $MnO_x$NPs-C nanocomposites were immobilized on FPCE for electrochemical measurement. Significant differences in the electrochemical properties of these samples were also observed. The results showed that the loading of $MnO_x$ on C played a significant role in the electrochemical water oxidation. For comparison, the electrocatalytic properties of the corresponding C and Mn were checked separately, and confirmed the superior electrocatalytic properties of MnOxNP—C over C and $MnO_x$. The $MnO_x$-C-1500 shows best electrocatalytic properties among the MnOxNP—C nanocomposites towards electrochemical water oxidation in NaOH. Therefore, $MnO_x$-C-1500 was considered as the catalyst in NaOH towards water electrooxidation among the prepared $MnO_x$-C nanocomposites. The overall electrochemical performance, activity, and stability of this efficient electrocatalyst proved to be excellent, and the catalyst is suitable for the electrochemical water oxidation in a variety of electrochemical applications including production of clean $H_2$ and $O_2$ and conversion of $CO_2$ to renewable fuels.

Numerous modifications and variations of the present invention are possible in light of the above teachings. It is therefore to be understood that within the scope of the appended claims, the invention may be practiced otherwise than as specifically described herein.

The invention claimed is:

1. An electrocatalyst, consisting of:
  manganese oxide nanoparticles supported on carbon microparticles, the carbon microparticles having a flat platelet morphology with a thickness of less than 10 µm; and
  optionally, at least one binder selected from the group consisting of a conductive polymer, polyethylene, polypropylene, polytetrafluoroethylene, polyvinylidene fluoride, styrene butadiene rubber, a tetrafluoroethylene hexafluoroethylene copolymer, a tetrafluoroethylene hexafluoropropylene copolymer, a tetrafluoroethylene perfluoroalkyl vinyl ether copolymer, ethylene-tetrafluoroethylene copolymer, polychlorotrifluoroethylene resin, a propylene-tetrafluoroethylene copolymer, and an ethylene-chlorotrifluoroethylene copolymer,
  wherein the manganese oxide nanoparticles are in the form of crystallites having an average diameter in a range of from greater than 10 to 25 nm, and the carbon microparticles are derived from *Albizia procera* leaves and have an average longest dimension in the range of from 100 to 300 µm,
  wherein the manganese oxide nanoparticles comprise hausmannite, tetragonal $Mn_3O_4$ and optionally further cubic MnO, and
  wherein the electrocatalyst has an Mn:C atomic ratio in a range of from 5:1 to 1:1.

2. The electrocatalyst of claim 1, wherein the manganese oxide nanoparticles have an average longest dimension in a range of from 10 to 15 nm.

3. The electrocatalyst of claim 1, wherein the manganese oxide nanoparticles have peaks in the XRD at 2(θ) Bragg angles of 37±1° and 42±1°.

4. The electrocatalyst of claim 1, having an Mn:C atomic ratio in a range of from 1.6875:1 to 1.12625:1.

5. The electrocatalyst of claim 1, wherein the crystallites of the manganese oxide have an average diameter in a range of from 13 to 15 nm.

6. The electrocatalyst of claim 1, consisting of only the manganese oxide nanoparticles, the manganese oxide nanoparticles consisting of the hausmannite, tetragonal $Mn_3O_4$ and optionally further the cubic MnO.

7. The electrocatalyst of claim 1, wherein the manganese oxide nanoparticles have XRD peaks at 2θ at 18°, 30°, 31°, 32°, 36°, 38°, 44°, 510, 54°, 56°, 59°, 60°, 65°, and 74°.

8. An electrode, comprising:
an electrically conductive substrate coated with the electrocatalyst of claim 1,
wherein the electrode has a current density in a range of from 6 to 18 $mA/cm^2$ at 1.5 V, and
wherein the electrode has an over potential in a range of from 800 to 900 mV at 5 $mA/cm^2$ in 0.1 M NaOH.

9. The electrode of claim 8, wherein the electrocatalyst is present on the surface of the electrode in an amount in a range of 0.2 to 10 $mg/cm^2$.

10. The electrode of claim 9, wherein the BET surface area of the electrode is in a range of from 140 to 230 $m^2/g$.

11. The electrode of claim 10, wherein the electrically conductive substrate is glassy carbon, graphite, gold, platinum, silver, iron, copper, aluminum, or a combination thereof.

12. An electrochemical cell, comprising:
a cathode electrode;
an anode electrode;
reference electrode; and
an electrolyte,
wherein at least one of electrodes is the electrode of claim 8.

13. The electrochemical cell of claim 12, wherein the electrolyte is an aqueous alkali metal hydroxide or a mineral acid at a concentration in a range of from 0.1 to 2.0 M.

14. The electrochemical cell of claim 12, wherein the electrolyte is 0.5 M aqueous sulfuric acid.

* * * * *